(12) United States Patent
Kim et al.

(10) Patent No.: US 10,568,077 B2
(45) Date of Patent: *Feb. 18, 2020

(54) METHOD AND APPARATUS FOR CONTROLLING UPLINK CONTROL INFORMATION TRANSMISSION IN WIRELESS COMMUNICATION SYSTEM PROVIDING WIDEBANDWIDTH SERVICES VIA CARRIER AGGREGATION

(71) Applicant: Samsung Electronics Co., Ltd., Suwon-si, Gyeonggi-do (KR)

(72) Inventors: Youngbum Kim, Seoul (KR); Seunghoon Choi, Suwon-si (KR); Yongjun Kwak, Yongin-si (KR); Donghan Kim, Osan-si (KR); Younsun Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/974,022

(22) Filed: May 8, 2018

(65) Prior Publication Data

US 2018/0263030 A1    Sep. 13, 2018

Related U.S. Application Data

(63) Continuation of application No. 15/010,584, filed on Jan. 29, 2016, now Pat. No. 9,974,062.

(Continued)

(51) Int. Cl.
*H04W 72/04* (2009.01)
*H04L 1/18* (2006.01)
(Continued)

(52) U.S. Cl.
CPC ....... *H04W 72/0413* (2013.01); *H04L 1/1812* (2013.01); *H04L 1/1861* (2013.01);
(Continued)

(58) Field of Classification Search
CPC ....... H04L 1/18; H04L 1/1812; H04L 1/1896; H04L 1/1887; H04L 1/1861; H04L 5/00; H04L 72/04; H04L 72/06; H04L 72/0413
See application file for complete search history.

(56) References Cited

U.S. PATENT DOCUMENTS

| 8,422,429 B2 | 4/2013 | Nam et al. |
| 8,625,554 B2 | 1/2014 | Zhang et al. |

(Continued)

FOREIGN PATENT DOCUMENTS

| CN | 102315897 A | 1/2012 |
| CN | 103168441 A | 6/2013 |

(Continued)

OTHER PUBLICATIONS

Samsung, Discussion on UCI transmission enhancements in Rel-11, 3GPP TSG RAN WG1 #66, 2 pages, Aug. 2011.*

(Continued)

*Primary Examiner* — Frank Duong
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method whereby a terminal transmits hybrid (Continued)

automatic repeat request (HARQ) acknowledgement (ACK)/negative ACK (NACK) information corresponding to downlink data received from a corresponding base station is provided.

16 Claims, 17 Drawing Sheets

Related U.S. Application Data

(60) Provisional application No. 62/112,986, filed on Feb. 6, 2015.

(51) Int. Cl.
  *H04L 5/00* (2006.01)
  *H04W 72/06* (2009.01)
(52) U.S. Cl.
  CPC .......... *H04L 1/1887* (2013.01); *H04L 1/1896* (2013.01); *H04L 5/00* (2013.01); *H04L 5/001* (2013.01); *H04L 5/0055* (2013.01); *H04L 5/0057* (2013.01); *H04L 5/0091* (2013.01); *H04W 72/06* (2013.01)

(56) References Cited

U.S. PATENT DOCUMENTS

| | | | |
|---|---|---|---|
| 8,767,647 B2 | 7/2014 | Heo et al. | |
| 9,345,008 B2* | 5/2016 | Jang | H04L 5/0053 |
| 9,584,265 B2 | 2/2017 | Yang et al. | |
| 2011/0092243 A1 | 4/2011 | Tee et al. | |
| 2011/0310823 A1 | 12/2011 | Nam et al. | |
| 2011/0310986 A1 | 12/2011 | Heo et al. | |
| 2012/0113831 A1 | 5/2012 | Pelletier et al. | |
| 2012/0207108 A1 | 8/2012 | Larsson et al. | |
| 2013/0016687 A1 | 1/2013 | Yang et al. | |
| 2013/0114391 A1 | 5/2013 | Jang et al. | |
| 2013/0235853 A1 | 9/2013 | Papasakellariou et al. | |
| 2014/0293932 A1 | 10/2014 | Papaskellariou et al. | |
| 2014/0307676 A1 | 10/2014 | Heo et al. | |
| 2014/0313999 A1 | 10/2014 | Xu et al. | |
| 2015/0098433 A1 | 4/2015 | Papasakellariou et al. | |
| 2016/0150529 A1* | 5/2016 | Noh | H04B 7/155 370/329 |
| 2016/0212649 A1 | 7/2016 | Chen et al. | |
| 2017/0041921 A1* | 2/2017 | Oketani | H04L 1/00 |

FOREIGN PATENT DOCUMENTS

| | | |
|---|---|---|
| KR | 10-2015-0113777 A | 10/2015 |
| WO | 2010/002899 A2 | 1/2010 |

OTHER PUBLICATIONS

Huawei, Enhancement for transmission of UCI on PUSCH, 3GPP TSG RAN WG1 Meeting #66, 2 pages, Aug. 2011.*
Alcatel-Lucent, UCI Transmission Enhancement for CoMP, 3GPP TSG RAN WG1 Meeting #68, 3 pages, Feb. 2012.*
European Search Report dated Feb. 7, 2018, issued in the European patent application No. 16746798.4.
Chinese Office Action dated Dec. 2, 2019, issued in a counterpart Chinese application No. 201680014127.6.

* cited by examiner

METHOD AND APPARATUS FOR CONTROLLING UPLINK CONTROL INFORMATION TRANSMISSION IN WIRELESS COMMUNICATION SYSTEM PROVIDING WIDEBANDWIDTH SERVICES VIA CARRIER AGGREGATION

CROSS-REFERENCE TO RELATED APPLICATION(S)

This application is a continuation application of prior application Ser. No. 15/010,584, filed on Jan. 29, 2016, which has issued as U.S. Pat. No. 9,974,062 on May 15, 2018 and claimed the benefit under 35 U.S.C. § 119(e) of a U.S. provisional patent application filed on Feb. 6, 2015 in the U.S. Patent and Trademark Office and assigned Ser. No. 62/112,986, the entire disclosure of which is hereby incorporated by reference.

TECHNICAL FIELD

The present disclosure relates to a cellular wireless communication system. More particularly, the present disclosure relates to a method and an apparatus for controlling uplink control information (UCI) transmission of a user equipment (UE) in a system providing supporting carrier aggregation (CA).

BACKGROUND

In contrast to wireless communication systems of the related art providing only voice-oriented services, advanced wireless communication systems, such as high speed packet access (HSPA), long term evolution (LTE) or evolved universal terrestrial radio access (E-UTRA) and LTE-advanced (LTE-A or E-UTRA evolution) of 3rd generation partnership project (3GPP), high rate packet data (HRPD) and ultra mobile broadband (UMB) of 3GPP2, and institute of electrical and electronics engineers (IEEE) 802.16e, may provide high-speed and high-quality packet data services. The LTE-A system as an evolved version of the LTE system supports carrier aggregation (CA), higher order multiple input multiple output (higher order MIMO), and other technologies in addition to existing LTE functionalities. In the description, LTE-A and LTE may be used interchangeably.

In the LTE or LTE-A system as a representative example of wideband wireless communication systems, orthogonal frequency division multiplexing (OFDM) is employed for the downlink and single carrier frequency division multiple access (SC-FDMA) is employed for the uplink. Such multiple access schemes may separate individual pieces of user data or control information by allocating or maintaining time-frequency resources to carry user data or control information so that they do not overlap with each other (i.e., so that orthogonality is preserved).

The above information is presented as background information only to assist with an understanding of the present disclosure. No determination has been made, and no assertion is made, as to whether any of the above might be applicable as prior art with regard to the present disclosure.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

SUMMARY

Aspects of the present disclosure are to address at least the above-mentioned problems and/or disadvantages and to provide at least the advantages described below. Accordingly, an aspect of the present disclosure is to provide a method whereby a terminal can feedback hybrid automatic repeat request (HARQ) acknowledgement (ACK) information to the corresponding base station in a mobile communication system.

Another aspect of the present disclosure is to provide a method and an apparatus that can use uplink frequency resources to transmit downlink data when the amount of downlink data traffic is greater than the amount of uplink data traffic in a frequency division duplex (FDD) system.

In accordance with an aspect of the present disclosure, a method of communication by a terminal in a wireless communication system is provided. The method includes receiving, from a base station, a plurality of offset parameters through higher layer signaling, identifying a PUSCH transmission offset corresponding to at least one of the plurality of offset parameters, based on a number of bits of hybrid automatic repeat request (HARQ) acknowledgement (ACK) information and transmitting, to the base station, uplink control information (UCI) on a PUSCH based on a number of coded modulation symbols, wherein the number of the coded modulation symbols is determined based on the identified PUSCH transmission offset.

In accordance with another aspect of the present disclosure, a method of communication by a base station in a wireless communication system is provided. The method includes transmitting, to a terminal, a plurality of offset parameters through higher layer signaling, and receiving, from the terminal, UCI on a PUSCH based on a number of modulation symbols determined based on a PUSCH transmission offset, wherein the PUSCH transmission offset is identified by the terminal corresponding to at least one of the plurality of offset parameters, based on a number of bits of hybrid automatic repeat request (HARQ) acknowledgement (ACK) information.

In accordance with another aspect of the present disclosure, a terminal in a wireless communication system is provided. The terminal includes a communication unit configured to transmit and receive signals and a control unit configured to control to receive, from a base station, a plurality of offset parameters through higher layer signaling, identify a PUSCH transmission offset corresponding to at least one of the plurality of offset parameters, based on a number of bits of hybrid automatic repeat request (HARQ) acknowledgement (ACK) information, and transmit, to the base station, uplink control information (UCI) on a PUSCH based on a number of coded modulation symbols, wherein the number of the coded modulation symbols is determined based on the identified PUSCH transmission offset.

In accordance with another aspect of the present disclosure, a base station in a wireless communication system is provided. The base station includes a communication unit configured to transmit and receive signals and a control unit configured to control to transmit, to a terminal, a plurality of offset parameters through higher layer signaling, and receive, from the terminal, UCI on a PUSCH based on a number of modulation symbols determined based on a PUSCH transmission offset, wherein the PUSCH transmission offset is identified by the terminal corresponding to at least one of the plurality of offset parameters, based on a number of bits of hybrid automatic repeat request (HARQ) acknowledgement (ACK) information.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
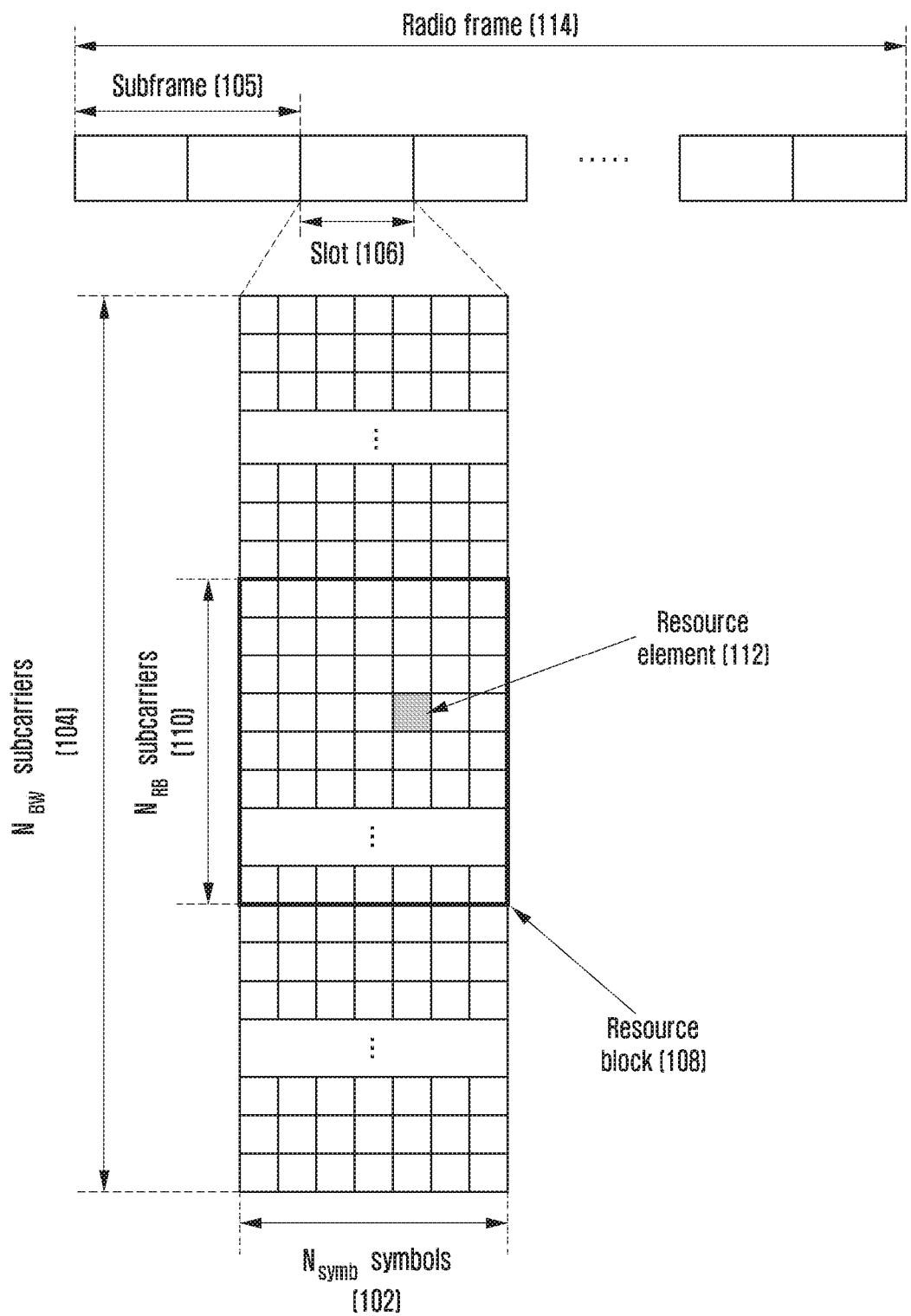
FIG. 1 illustrates structures of a time-frequency resource grid based on single carrier frequency division multiple access (SC-FDMA)/orthogonal frequency division multiple access (OFDMA) and subframes in a long term evolution (LTE) or LTE-advanced (LTE-A) system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The following description is focused on the advanced evolved universal terrestrial radio access (E-UTRA) (long term evolution-advanced (LTE-A)) system supporting carrier aggregation (CA). However, it should be understood by those skilled in the art that the subject matter of the present disclosure is applicable to other communication systems having similar technical backgrounds and channel configurations without significant modifications departing from the scope of the present disclosure. For example, the subject matter of the present disclosure may be applied to multicarrier high speed packet access (HSPA).

Descriptions of well-known functions and structures incorporated herein may be omitted to avoid obscuring the subject matter of the present disclosure. Descriptions of components having substantially the same configurations and functions may also be omitted.

In the drawings, some elements are exaggerated, omitted, or only outlined in brief, and thus may be not drawn to scale. The same or similar reference symbols are used throughout the drawings to refer to the same or like parts.

The aspects, features and advantages of certain embodiments of the present disclosure will be more apparent from the following detailed description taken in conjunction with the accompanying drawings. The description of the various embodiments does not describe every possible instance of the present disclosure. It should be apparent to those skilled in the art that the following description of various embodiments of the present disclosure is provided for illustration purpose only and not for the purpose of limiting the present disclosure as defined by the appended claims and their equivalents. The same reference symbols are used throughout the description to refer to the same parts.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module", and the like, may refer to a software component or hardware component, such as a field programmable gate array (FPGA) or an application specific integrated circuit (ASIC) capable of carrying out a function or an operation. However, "unit", and the like, is not limited to hardware or software. A unit, and the like, may be configured so as to reside in an addressable storage medium or to drive one or more processors. Units, and the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose large components and units. Components and units may be configured to drive a device or one or more processors in a secure multimedia card.

The LTE or LTE-A system employs various technologies, such as adaptive modulation and coding (AMC) and channel sensitive scheduling in order to increase transmission efficiency. By use of AMC, the transmitter can adjust the amount of transmission data according to the channel state. For example, when the channel state is not acceptable, the transmitter can reduce the amount of transmission data so as to adjust the probability of a reception error to a desired level. When the channel state is acceptable, the transmitter can increase the amount of transmission data so as to effectively deliver a large amount of information while adjusting the probability of a reception error to a desired level. By use of resource management based on channel-sensitive scheduling, the transmitter may selectively provide a service to a user with a good channel state among multiple users, increasing the system throughput in comparison to assigning a channel to one user and providing a service to the user. Such throughput increment is referred to as multi-user diversity gain. Namely, AMC and channel-sensitive scheduling are methods that enable the transmitter to apply an appropriate modulation and coding technique at the most efficient point in time determined based on partial channel state information (CSI) fed back from the receiver.

When AMC is used together with a system supporting multiple input multiple output (MIMO), the AMC may also determine the number of spatial layers (or rank) and precoding of a transmitted signal. In this case, to determine the optimal data rate, AMC may consider not only the coding rate and modulation scheme but also the number of layers used for transmission using MIMO.

To support AMC operation, a user equipment (UE) reports CSI to a corresponding base station (ENB). The UE measures CSI with respect to a reference signal (RS) transmitted by the ENB. RSs include a cell-specific RS (CRS) and CSI-RS. The time-frequency resources to which CRS and CSI-RS are mapped, and CRS and CSI-RS formats follow the pre-defined settings.

CSI may include at least one of channel quality indicator (CQI), precoding matrix indicator (PMI), and rank indicator (RI). CQI indicates the signal to interference and noise ratio (SINR) for the wideband or a subband of the system. In general, CQI is represented as a modulation and coding scheme (MCS) satisfying a preset level of data reception performance. PMI indicates precoding information needed by the ENB transmitting data through multiple antennas in a system supporting MIMO. RI indicates rank information needed by the ENB transmitting data through multiple antennas in a system supporting MIMO. CSI is information that is provided by the UE to the ENB to help the ENB make a scheduling-related determination. The ENB may autonomously determine specific values for MCS, precoding and rank to be applied to data transmission.

The UE may transmit CSI at regular intervals on a periodic basis according to a prior agreement with the ENB. This is referred to as "periodic CSI reporting". The ENB notifies the UE of control information needed for periodic CSI reporting (e.g., CSI transmission period and CSI transmission resource) in advance via signaling. For periodic CSI reporting, the UE transmits CSI to the ENB mainly through physical uplink control channel (PUCCH) being an uplink control channel. In an exceptional case where the UE has to perform transmission on physical uplink shared channel (PUSCH) being an uplink data channel at a point in time designated for CSI transmission, the UE transmits CSI being multiplexed with other uplink data to the ENB through PUSCH.

Separately from periodic CSI reporting, the ENB may request a UE to perform aperiodic CSI reporting if necessary. The ENB transmits control information requesting aperiodic CSI reporting to the UE via a control channel scheduling UE uplink data. As a reply to the aperiodic CSI report request, the UE transmits CSI to the ENB via PUSCH being an uplink data channel.

The LTE or LTE-A system employs a hybrid automatic repeat request (HARQ) scheme in which when a decoding error occurs at initial transmission, corresponding data is retransmitted at the physical layer. In the HARQ scheme, when the receiver fails to accurately decode data, the receiver transmits negative acknowledgement (NACK) indicating decoding failure to the transmitter, and the transmitter may then retransmit the data. The receiver combines the retransmitted data with the existing data having encountered a decoding error to thereby increase data reception performance. When the receiver succeeds in decoding data, the receiver transmits acknowledgement (ACK) indicating decoding success to the transmitter, enabling the transmitter to transmit new data.

Control information fed back by the UE to the ENB including HARQ ACK/NACK and CSI is referred to as uplink control information (UCI). In the LTE or LTE-A system, UCI may be transmitted to the ENB through PUCCH being an uplink control channel used only for control information or may be transmitted together with other UE data in a multiplexed form through PUSCH being a physical uplink data channel.

The LTE or LTE-A system may support frequency division duplex (FDD) and time division duplex (TDD). In FDD, different frequencies are used for the downlink and the uplink, and transmission of an uplink signal is separated from transmission of a downlink signal in the frequency domain. In TDD, common frequencies are used for the downlink and the uplink, and transmission of an uplink signal is separated from transmission of a downlink signal in the time domain.

FIG. 1 illustrates structures of a time-frequency resource grid based on SC-FDMA OFDMA and subframes in an LTE or LTE-A system according to an embodiment of the present disclosure.

Referring to FIG. 1, the horizontal axis indicates the time domain, and the vertical axis indicates the frequency domain. In the time domain, the minimum transmission unit is orthogonal frequency division multiplexing (OFDM) symbols for the downlink and is single carrier frequency division multiple access (SC-FDMA) symbols for the uplink, $N_{symb}$ symbols (102) constitute one slot (106), and two slots constitute one subframe (105). The length of a slot is 0.5 ms, and the length of a subframe is 1.0 ms. A radio frame 114 is a time-domain unit composed of 10 subframes. In the frequency domain, the minimum transmission unit is subcarriers, and the total system transmission bandwidth is composed of $N_{BW}$ subcarriers (104).

In the time-frequency grid, the basic resource unit is a resource element (RE) 112, which may be represented by OFDM or SC-FDMA symbol indexes and subcarrier indexes. A resource block (RB) 108 (or physical RB (PRB)) is defined by $N_{symb}$ successive OFDM or SC-FDMA symbols (102) in the time domain and $N_{RB}$ successive subcarriers (110) in the frequency domain. Hence, one RB 108 is composed of $N_{symb} \times NRB$ REs. The number of SC-FDMA or OFDM symbols ($N_{symb}$) is determined according to the length of a cyclic prefix (CP) inserted between symbols for preventing inter-symbol interference. For example, $N_{symb}$ is set to 7 when a regular CP is applied, and $N_{symb}$ is set to 6 when an extended CP is applied. $N_{BW}$ and $N_{RB}$ are in proportion to the system transmission bandwidth. The data rate increases in proportion to the number of RBs scheduled to the UE. In the LTE or LTE-A system, six transmission bandwidths are defined for operation. In FDD mode where different frequencies are used for the uplink and the downlink, the uplink transmission bandwidth may differ from the downlink transmission bandwidth. The channel bandwidth refers to an RF bandwidth corresponding to the system transmission bandwidth. Table 1 illustrates a correspondence between system transmission bandwidths and channel bandwidths defined for the LTE system. For example, the transmission bandwidth of an LTE or LTE-A system supporting a channel bandwidth of 10 MHz is composed of 50 RBs.

TABLE 1

| Channel bandwidth $BW_{channel}$ [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

Compared with the LTE system, the LTE-A system supports a wider bandwidth and may achieve a higher data transfer rate. To preserve backward compatibility with existing LTE terminals, the LTE-A system should allow LTE terminals to receive services therefrom. To this end, the LTE-A system may employ component carriers (CC) dividing the total transmission bandwidth into narrow bandwidths suitable to LTE terminals, and may combine several CC to serve individual LTE terminals. The LTE-A system may generate and transmit data on a component carrier basis. Hence, the LTE-A system may support higher-speed data transmission by using existing transmission and reception processes of the LTE system on a component carrier basis. The LTE-A system may aggregate up to five LTE carriers through CA and may provide wideband services with a maximum bandwidth of 100 MHz (20 MHz×5).

In the LTE or LTE-A system, downlink control information is transmitted via initial N OFDM symbols of a subframe. Here, in general, N={1, 2, 3}. The value of N varies for each subframe according to the amount of control information to be transmitted at the current subframe. The downlink control information may include a control channel transport interval indicator indicating the number of OFDM symbols used to transmit the control information, scheduling information for downlink or uplink data, and HARQ ACK/NACK information.

In the LTE or LTE-A system, scheduling information for downlink data or uplink data is transmitted by the ENB to the UE as downlink control information (DCI). Here, the uplink (UL) indicates a wireless link through which the UE transmits a data or control signal to the ENB, and the downlink (DL) indicates a wireless link through which the ENB transmits a data or control signal to the UE. Various DCI formats are defined. The DCI format to be used may be determined according to various parameters related to scheduling information for downlink data (DL grant), scheduling information for uplink data (UL grant), compact DCI with a small size, spatial multiplexing using multiple antennas, and power control DCI. For example, DCI format 1 for scheduling information of downlink data (DL grant) is configured to include at least the following pieces of control information.

Resource allocation type 0/1 flag: this notifies the UE of whether the resource allocation scheme is of type 0 or type 1. Type 0 indicates resource allocation in the unit of RB group (RBG) using a bitmap. In the LTE or LTE-A system, the basic scheduling unit is RB represented as a time-frequency resource. An RBG including multiple RBs is the basic scheduling unit for type 0. Type 1 indicates allocation of a specific RB in one RBG.

Resource block assignment: this notifies the UE of an RB allocated for data transmission. The resource represented by RB assignment is determined according to the system bandwidth and resource allocation scheme.

MCS: this indicates the modulation scheme applied for data transmission and the transport block size (TBS) for data to be transmitted.

HARQ process number: this indicates the process number of the corresponding HARQ process.

New data indicator: this indicates either initial transmission for HARQ or retransmission.

Redundancy version: this indicates the redundancy version for HARQ.

Transmit power control (TPC) command for PUCCH: this indicates a TPC command for PUCCH being an uplink control channel.

DCI is channel coded and modulated, and transmitted through a physical downlink control channel (PDCCH) or enhanced PDCCH (EPDCCH).

In general, for each UE, DCI is channel coded separately and transmitted via independent PDCCH. In the time domain, PDCCH is mapped and transmitted during the control channel transport interval. In the frequency domain, the mapping position of PDCCH is determined by the identifier (ID) of each UE and PDCCH is dispersed across the overall system transmission bandwidth.

Downlink data is transmitted via physical downlink shared channel (PDSCH) serving as a physical downlink data channel. PDSCH is transmitted after the control channel transport interval. Scheduling information for PDSCH, such as mapping positions in the frequency domain or the modulation scheme is notified by the ENB to the UE by use of scheduling information for downlink data among DCI transmitted on PDCCH.

Uplink data is transmitted via PUSCH serving as a physical uplink data channel. Scheduling information for PUSCH, such as mapping positions in the frequency domain or the modulation scheme is notified by the ENB to the UE by use of scheduling information for uplink data among DCI transmitted on PDCCH.

The ENB uses the 5-bit MCS field in DCI to notify the UE of the modulation scheme applied to PDSCH (to be transmitted to UE) or PUSCH (to be transmitted by UE) and data size (TBS). TBS indicates the size of a transport block before channel coding for error correction.

Modulation schemes supported by the LTE or LTE-A system include quadrature phase shift keying (QPSK), 16 quadrature amplitude modulation (QAM), 64 QAM and 256 QAM, whose modulation order ($Q_m$) is 2, 4, 6 and 8, respectively. For example, it is possible to transmit 2, 4, 6 and 8 bits per symbol by using QPSK, 16 QAM, 64 QAM and 256 QAM, respectively.

As described above, the LTE-A system may aggregate up to five LTE carriers through CA.

In a system supporting CA, individual CC are divided into primary cell or first cell (Pcell) or secondary cell or second cell (Scell). Pcell provides a UE with basic radio resources and operates as the reference cell for initial attachment and handover operation of the UE. Pcell is composed of a downlink primary frequency (or primary component carrier (PCC)) and an uplink primary frequency. Scell provides the UE with additional radio resources together with Pcell and is composed of a downlink secondary frequency (or secondary component carrier (SCC)) and an uplink secondary frequency. A UE supporting CA may simultaneously transmit and receive data or control information to and from the ENB through Pcell and one or more Scells. In the description, words "cell" and "component carrier" may be used interchangeably.

Meanwhile, standardization efforts are underway to enhance the CA technology of the LTE-A system by aggregating up to 32 cells. To this end, it is necessary to develop a method that can feedback HARQ ACK/NACK information corresponding to data received via multiple cells to the ENB.

Embodiment I

Hereinafter, preferred embodiments of the present disclosure are described below with reference to the accompanying drawings. Detailed descriptions of well-known functions and structures incorporated herein may be omitted to avoid obscuring the subject matter of the present disclosure. Particular terms may be defined to describe the disclosure in the best manner. Hence, the meaning of specific terms or words used in the description should not be limited to the literal or commonly employed sense, but should be construed in accordance with the spirit of the disclosure. In the following description, the ENB is a main agent allocating resources to a UE, and may be one of an eNode B (ENB), a Node B, a BS, a wireless access point, an ENB controller, a network node, and the like. The terminal may be one of a UE, a mobile station (MS), a cellular phone, a smartphone, a computer, a multimedia system supporting communication, and the like. The downlink (DL) indicates a wireless link through which the ENB transmits a data or control signal to the UE, and the uplink (UL) indicates a wireless link through which the UE transmits a data or control signal to the ENB. The following description is focused on LTE and LTE-A systems. However, it should be understood that the subject matter of the present disclosure is applicable to other communication systems having similar technical backgrounds and channel configurations without significant modifications departing from the scope of the present disclosure.

Figure 2:
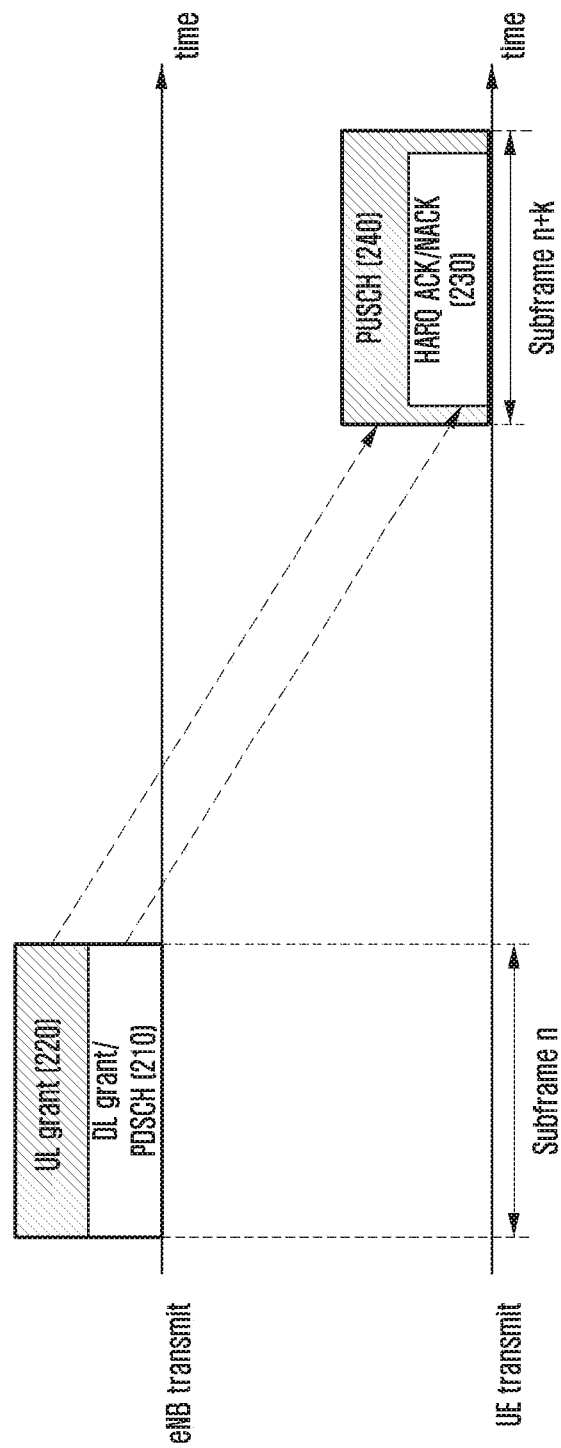
FIG. 2 illustrates a method whereby a user equipment (UE) feedbacks hybrid automatic repeat request (HARQ) acknowledgement (ACK)/negative ACK (NACK) to a base station (ENB) in an LTE or LTE-A system according to an embodiment of the present disclosure.

A description is given of a method whereby a UE feedbacks HARQ ACK/NACK information as UCI to the ENB in the LTE or LTE-A system with reference to FIG. 2.

FIG. 2 illustrates a method whereby a UE feedbacks hybrid automatic repeat request (HARQ) acknowledgement (ACK)/negative ACK (NACK) to a base station (ENB) in an LTE or LTE-A system according to an embodiment of the present disclosure.

Referring to FIG. 2, at subframe n, the ENB transmits downlink scheduling information and associated PDSCH to the UE at operation 210 and transmits uplink scheduling information to the UE at operation 220. At subframe n+k, the UE transmits HARQ ACK/NACK information corresponding to PDSCH to the ENB at operation 230. Here, as the ENB has scheduled PUSCH transmission, the UE transmits the HARQ ACK/NACK information in a multiplexed form with PUSCH at operation 240. If the ENB has not scheduled PUSCH transmission, the UE transmits HARQ ACK/NACK information to the ENB via PUCCH. The value of k is determined based on the time needed by the UE to perform DCI, PDSCH or PUSCH processing, and should be agreed in advance between the ENB and UE so as not to cause an error. In general, k is set to 4.

Figure 3:
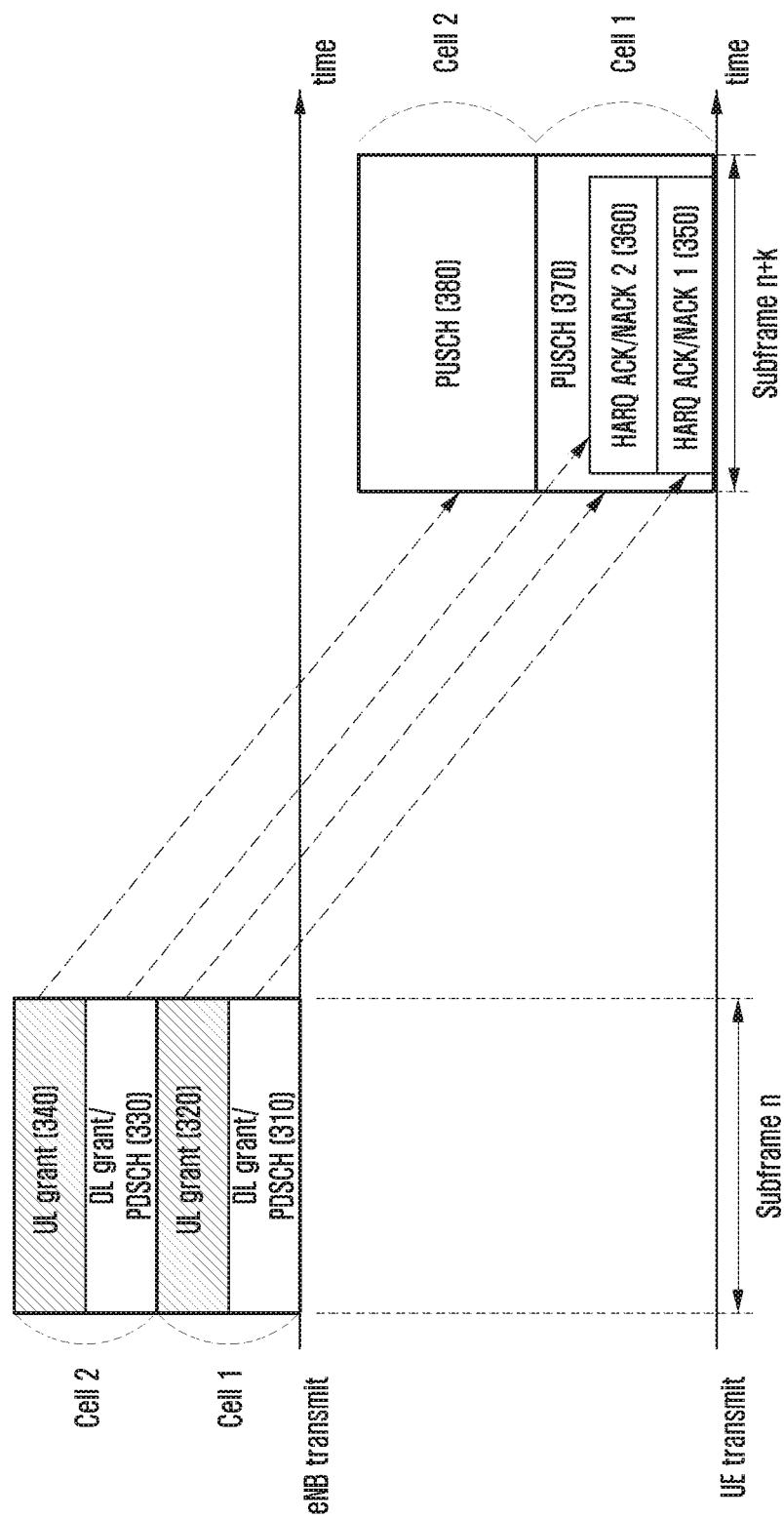
FIG. 3 illustrates a method whereby a UE supporting carrier aggregation (CA) feedbacks HARQ ACK/NACK when multiple physical uplink shared channels (PUSCHs) are scheduled in an LTE or LTE-A system according to an embodiment of the present disclosure.

FIG. 3 illustrates a method whereby a UE supporting CA feedbacks HARQ ACK/NACK when multiple PUSCHs are scheduled in an LTE or LTE-A system according to an embodiment of the present disclosure.

Referring to FIG. 3, at subframe n, the ENB transmits the UE downlink scheduling information for cell 1 and cell 2 and associated PDSCH at operations 310 and 330, and transmits the UE uplink scheduling information for cell 1 and cell 2 at operations 320 and 340. At subframe n+k, the UE transmits the ENB two pieces of HARQ ACK/NACK information corresponding to PDSCH at operations 350 and 360. The amount of HARQ ACK/NACK information increases in proportion to the number of aggregated carriers. When the ENB schedules PUSCH transmission about multiple cells for the UE supporting CA at operations 370 and 380, the UE may transmit the ENB HARQ ACK/NACK information at operations 350 and 360 multiplexed with PUSCH associated with a cell having the lowest cell index at operation 370. When the ENB schedules PUSCH about one cell for the UE, the UE transmits the ENB HARQ ACK/NACK information at operations 350 and 360 multiplexed with PUSCH having been scheduled. When the ENB does not schedule PUSCH for the UE, the UE transmits HARQ ACK/NACK information at operations 350 and 360 to the ENB via PUCCH. For a UE supporting CA, PUCCH may be always associated with Pcell.

Figure 4:
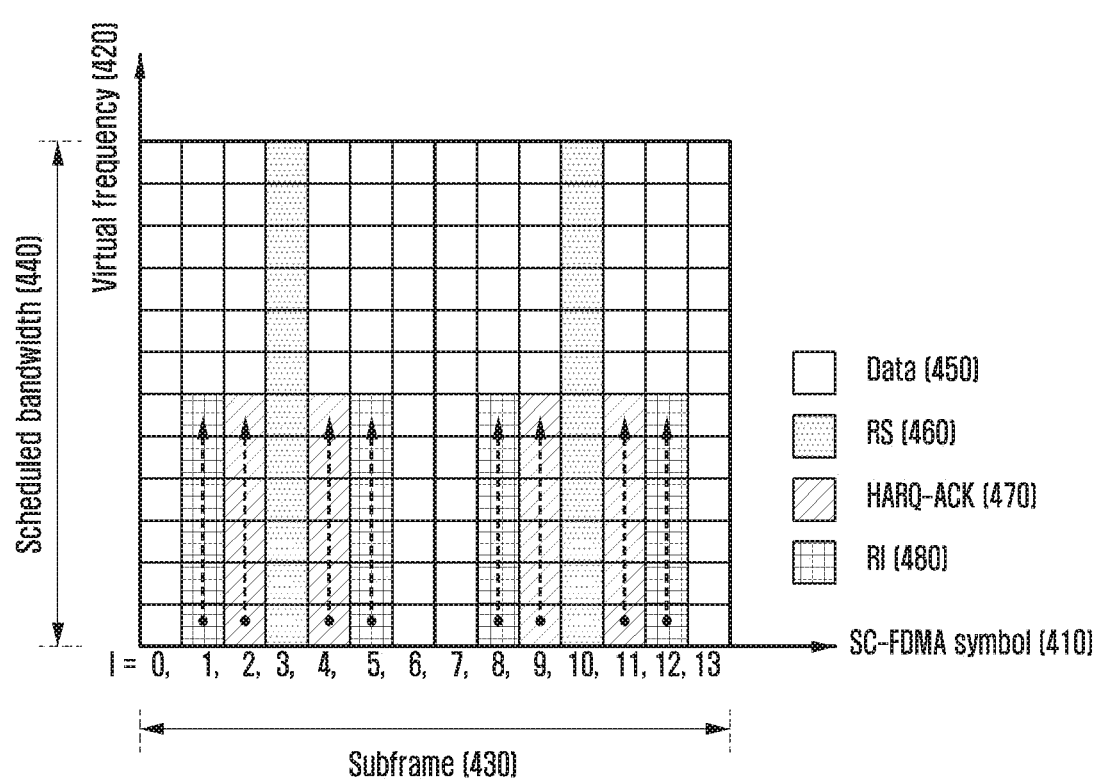
FIG. 4 illustrates a method whereby a UE multiplexes HARQ ACK/NACK with PUSCH in an LTE or LTE-A system according to an embodiment of the present disclosure.

With reference to FIG. 4, a description is given of a scheme for mapping HARQ ACK/NACK information when HARQ ACK/NACK information is multiplexed with PUSCH.

FIG. 4 illustrates a method whereby a UE multiplexes HARQ ACK/NACK with PUSCH in an LTE or LTE-A system according to an embodiment of the present disclosure.

Referring to FIG. 4, the horizontal axis indicates the time domain, where there are shown SC-FDMA symbol indexes 0 to 13 (410) within one subframe 430 being a time duration when PUSCH is transmitted. Here, it is assumed that a regular CP is used and one subframe is composed of 14 SC-FDMA symbols. The vertical axis indicates the virtual frequency domain 420, which represents the sequence of input strings fed to a discrete fourier transform (DFT) or transform precoding signal processor need to generate SC-FDMA signals, other than actual frequency domain indexes. When the UE receives a schedule about PUSCH transmission from the ENB, the UE maps, for one subframe, PUSCH to a radio resource corresponding to the scheduled PUSCH transmission bandwidth 440 for transmission. To support PUSCH channel estimation of the ENB, a RS 460 is to be transmitted during the same subframe. RS is mapped to SC-FDMA symbol 3 and SC-FDMA symbol 10 in accordance with the scheduled PUSCH transmission bandwidth 440 for transmission. For example, the UE maps PUSCH to the remaining portion of a radio resource corresponding to the scheduled PUSCH transmission bandwidth 440 except for the portion of the radio resource to which RS is mapped. When HARQ ACK/NACK information 470 is multiplexed with PUSCH, the HARQ ACK/NACK information is mapped to SC-FDMA symbol 2, SC-FDMA symbol 4, SC-FDMA symbol 9 and SC-FDMA symbol 11 placed adjacent to the SC-FDMA symbol to which RS is mapped, in which case a good channel estimation effect may be produced. When RI information (480) is multiplexed with PUSCH, the RI information may be mapped to SC-FDMA symbol 1, SC-FDMA symbol 5, SC-FDMA symbol 8 and SC-FDMA symbol 12, which are placed adjacent to the SC-FDMA symbol to which RS is mapped except for the SC-FDMA symbol to which HARQ ACK/NACK information is mapped. It is possible to correct an error occurring at uplink data being transmitted via PUSCH by use of HARQ retransmission. On the other hand, as HARQ retransmission is not applied to control information, such as HARQ ACK/NACK information and RI information, it is more difficult to correct an error occurring at control information in comparison to data. Hence, for excellent channel estimation, it is necessary to use a good mapping scheme for HARQ ACK/NACK information and RI information as described above, resulting in good error correction performance.

To be more specific to the mapping sequence, HARQ ACK/NACK information may be mapped to SC-FDMA symbol 11 of the last column of the scheduled PUSCH transmission bandwidth 440, SC-FDMA symbol 2, SC-FDMA symbol 4, SC-FDMA symbol 9 (in this order), and then mapped to SC-FDMA symbol 11 of the second last column of the scheduled PUSCH transmission bandwidth 440, SC-FDMA symbol 2, SC-FDMA symbol 4, SC-FDMA symbol 9, . . . (in this order).

RI information may be mapped to SC-FDMA symbol 12 of the last column of the scheduled PUSCH transmission bandwidth 440, SC-FDMA symbol 1, SC-FDMA symbol 5, SC-FDMA symbol 8 (in this order), and then mapped to SC-FDMA symbol 12 of the second last column of the scheduled PUSCH transmission bandwidth 440, SC-FDMA symbol 1, SC-FDMA symbol 5, SC-FDMA symbol 8, . . . (in this order).

Uplink data is mapped to the remaining resource region 450 for transmission except for the resource region to which RS, HARQ ACK/NACK information or RI information is mapped.

The number of modulation symbols for HARQ ACK/NACK information or RI information mapped during one subframe (Q') is determined according to Equation 1 below.

$$Q' = \min\left(\left\lceil \frac{O \cdot M_{sc}^{PUSCH\text{-}initial} \cdot N_{symb}^{PUSCH\text{-}initial} \cdot \beta_{offset}^{PUSCH}}{\sum_{r=0}^{C-1} K_r} \right\rceil, 4 \cdot M_{sc}^{PUSCH}\right)$$

Equation 1

In Equation 1, O indicates the number of bits of HARQ ACK/NACK or RI. $M_{sc}^{PUSCH}$ indicates the PUSCH transmission bandwidth per subcarrier scheduled for the UE at the current subframe. $M_{sc}^{PUSCH\text{-}initial}$ indicates the PUSCH transmission bandwidth scheduled for the UE at a subframe where initial PUSCH transmission occurs. $N_{symb}^{PUSCH\text{-}initial}$ indicates the number of SC-FDMA symbols at the subframe where initial PUSCH transmission occurs. In the case of regular CP, $N_{symb}^{PUSCH\text{-}initial}$ is 13(=14−1) when SRS transmission also occurs at the subframe, and is 14 when SRS transmission does not occur at the subframe. When the size of uplink data to be transmitted via PUSCH is greater than a preset threshold, the uplink data is segmented into multiple code blocks and channel coded for optimized channel coding. Here, the number of segmented code blocks is denoted by C. $K_r$ indicates the number of bits of code block # r. The values for $M_{sc}^{PUSCH\text{-}initial}$, C, and $K_r$ can be obtained from uplink scheduling information of the ENB having scheduled initial PUSCH transmission. For HARQ ACK/NACK information, $\beta_{offset}^{PUSCH} = \beta_{offset}^{HARQ\text{-}ACK}$, and the ENB selects one of defined values for $\beta_{offset}^{HARQ\text{-}ACK}$ based on reception performance about HARQ ACK/NACK information and notifies the selected value to the UE. For RI information, $\beta_{offset}^{PUSCH} = \beta_{offset}^{RI}$, and the ENB selects one of defined values for $\beta_{offset}^{RI}$ based on reception performance about RI information and notifies the selected value to the UE.

Among parameters in Equation 1, the value of O increases in proportion to the number of aggregated cells when CA is applied. As four SC-FDMA symbols are available for transmission of HARQ ACK/NACK or RI information at one subframe, transmission of HARQ ACK/NACK or RI information is limited to the maximum of $4 \times M_{sc}^{PUSCH}$. For example, the possibility to encounter such limitation increases as the number of aggregated cells for CA increases, resulting in degradation of reception performance of HARQ ACK/NACK, RI or PUSCH.

To address the above issue, the present disclosure proposes the following schemes.
1) Scheme to map HARQ ACK/NACK or RI information
2) Scheme to adjust TBS of PUSCH
3) Scheme to adjust PUSCH scheduling of ENB A description is given of main operations of the present disclosure through various embodiments.

Embodiment I-1

Embodiment I-1 proposes a scheme to maintain reception performance of UCI or PUSCH in the case where the UE transmits the ENB UCI (including HARQ ACK/NACK information or RI information) in a multiplexed form with PUSCH.

Figure 5:
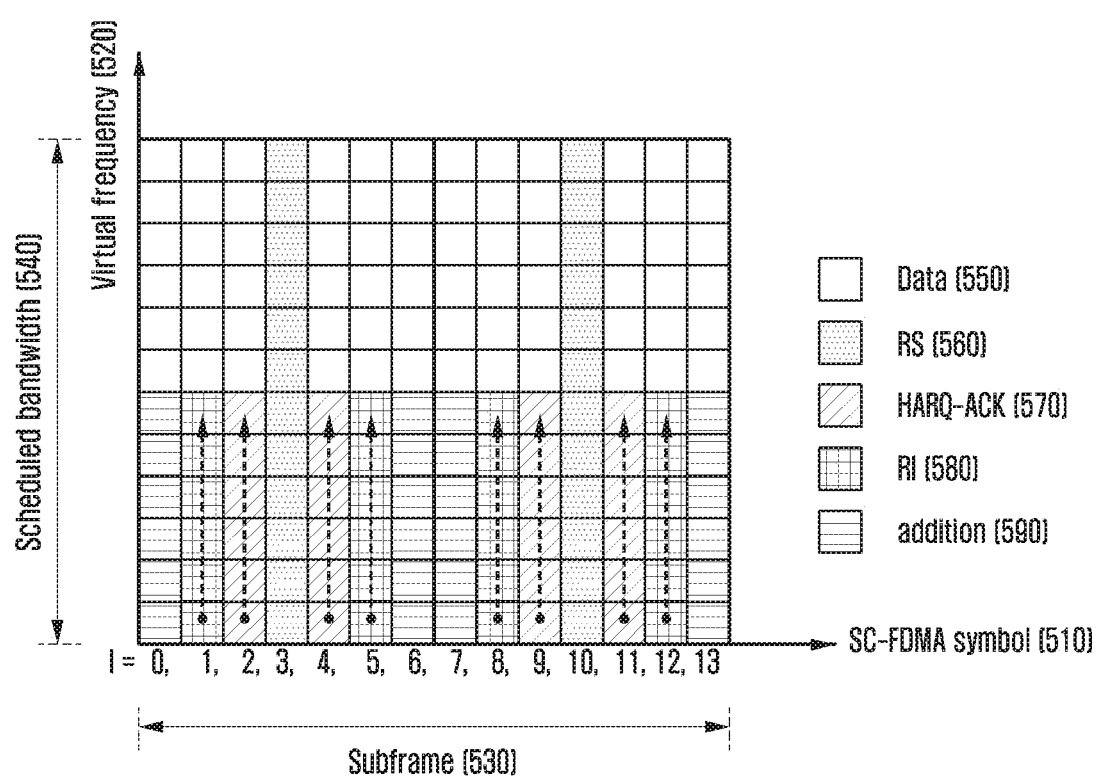
FIG. 5 illustrates a method whereby a UE multiplexes HARQ ACK/NACK with PUSCH according to an Embodiment I-1 of the present disclosure.

A description is given of main points of the Embodiment I-1 with reference to FIG. 5.

FIG. 5 illustrates a method whereby a UE multiplexes HARQ ACK/NACK with PUSCH according to an Embodiment I-1 of the present disclosure.

Referring to FIG. 5, elements 510, 520, 530, 540, 550, 560, 570, and 580 are equivalent to elements 410, 420, 430, 440, 450, 460, 470, and 480 of FIG. 4. In Embodiment I-1, to obtain additional resources about UCI multiplexed with PUSCH for transmission compared to the existing scheme described in FIG. 4, SC-FDMA symbol 0, SC-FDMA symbol 6, SC-FDMA symbol 7 and SC-FDMA symbol 13 (590) may be used. For example, in FIG. 5, the UE may map HARQ ACK/NACK information not only to SC-FDMA symbol 2, SC-FDMA symbol 4, SC-FDMA symbol 9, SC-FDMA symbol 11 but also to SC-FDMA symbol 0, SC-FDMA symbol 6, SC-FDMA symbol 7, SC-FDMA symbol 13 (590). In this case, Equation 1 is replaced with Equation 2 below.

$$Q' = \min\left(\left\lceil \frac{O \cdot M_{sc}^{PUSCH\text{-}initial} \cdot N_{symb}^{PUSCH\text{-}initial} \cdot \beta_{offset}^{PUSCH}}{\sum_{r=0}^{C-1} K_r} \right\rceil, k \cdot M_{sc}^{PUSCH}\right)$$

Equation 2

In Equation 2, k indicates the number of SC-FDMA symbols used by the UE to map HARQ ACK/NACK or RI information and has an integer value greater than or equal to 4. The value of k may be different for HARQ ACK/NACK information and RI information according to how to distribute four additional SC-FDMA symbols used for UCI transmission (i.e., SC-FDMA symbol 0, SC-FDMA symbol 6, SC-FDMA symbol 7, SC-FDMA symbol 13 (590)) between HARQ ACK/NACK information and RI information. For example, when all the four additional SC-FDMA symbols (590) are used for HARQ ACK/NACK mapping, as eight SC-FDMA symbols (including four existing SC-FDMA symbols (570)) are used in total for HARQ ACK/NACK mapping, the value of k for HARQ ACK/NACK information is 8. In this case, at the same subframe, as four existing SC-FDMA symbols (570) are used for RI information, the value of k for RI information is 4. As the last SC-FDMA symbol of a subframe may be used to transmit sounding RS (SRS), it may be not additionally used for UCI transmission. The ENB and UE may make a prior agreement about the actually used SC-FDMA symbols for mapping among the four additional SC-FDMA symbols (590) so as to prevent a transmission or reception error.

In addition, the ENB and UE may make a prior agreement about the sequence of mapping of HARQ ACK/NACK information to the additional SC-FDMA symbols so as to prevent a transmission or reception error. Here, it is possible to use option 1 for preserving the existing mapping scheme described in FIG. 4 as far as possible, and option 2 for defining a new mapping scheme separately from the existing mapping scheme. For example, when HARQ ACK/NACK information is mapped initially to SC-FDMA symbol 2, SC-FDMA symbol 4, SC-FDMA symbol 9 and SC-FDMA symbol 11, and additionally to SC-FDMA symbol 0, SC-FDMA symbol 6 and SC-FDMA symbol 7, the value of k for HARQ ACK/NACK is 7 (k=7).

In this case, as an instance of option 1, HARQ ACK/NACK information may be mapped first to SC-FDMA symbol 11 of the last column of the scheduled PUSCH transmission bandwidth 540, SC-FDMA symbol 2, SC-FDMA symbol 4, SC-FDMA symbol 9 (in this order), and mapped additionally to SC-FDMA symbol 0, SC-FDMA symbol 6, SC-FDMA symbol 7 (in this order). In succession, the HARQ ACK/NACK information may be mapped to SC-FDMA symbol 11 of the second last column of the scheduled PUSCH transmission bandwidth 540, SC-FDMA symbol 2, SC-FDMA symbol 4, SC-FDMA symbol 9, SC-FDMA symbol 0, SC-FDMA symbol 6, SC-FDMA symbol 7 (in this order).

As an instance of option 2, in the UE, HARQ ACK/NACK information may be mapped first to SC-FDMA symbol 0 of the last column of the scheduled PUSCH transmission bandwidth 540, SC-FDMA symbol 2, SC-FDMA symbol 4, SC-FDMA symbol 6, SC-FDMA symbol 7, SC-FDMA symbol 9, SC-FDMA symbol 11 (in this order), and then mapped to SC-FDMA symbol 0 of the second last column of the scheduled PUSCH transmission bandwidth 540, SC-FDMA symbol 2, SC-FDMA symbol 4, SC-FDMA symbol 6, SC-FDMA symbol 7, SC-FDMA symbol 9, SC-FDMA symbol 11, . . . (in this order).

Embodiment I-2

Embodiment I-2 proposes a scheme for adjusting PUSCH TBS to maintain reception performance of UCI or PUSCH in the case where the UE transmits the ENB UCI (including HARQ ACK/NACK information or RI information) in a multiplexed form with PUSCH. To determine the size of data to be transmitted via PUSCH (Transport Block Size, TBS), the UE may refer to a TBS table using TBS index ($I_{TBS}$) and the number of RBs used for PUSCH transmission ($N_{PRB}$). The UE may obtain values for $I_{TBS}$ and $N_{PRB}$ respectively from MCS information and RB assignment information contained in the uplink scheduling information notified by the ENB. Table 2 shows a part of the TBS table.

TABLE 2

| | $N_{PRB}$ | | | | | | | | | | |
|---|---|---|---|---|---|---|---|---|---|---|---|
| $I_{TBS}$ | 1 | 2 | 3 | 4 | 5 | 6 | 7 | 8 | 9 | 10 | ... |
| 0 | 16 | 32 | 56 | 88 | 120 | 152 | 176 | 208 | 224 | 256 | ... |
| 1 | 24 | 56 | 88 | 144 | 176 | 208 | 224 | 256 | 328 | 344 | |
| 2 | 32 | 72 | 144 | 176 | 208 | 256 | 296 | 328 | 376 | 424 | |
| 3 | 40 | 104 | 176 | 208 | 256 | 328 | 392 | 440 | 504 | 568 | |
| 4 | 56 | 120 | 208 | 256 | 328 | 408 | 488 | 552 | 632 | 696 | |
| 5 | 72 | 144 | 224 | 328 | 424 | 504 | 600 | 680 | 776 | 872 | |
| 6 | 328 | 176 | 256 | 392 | 504 | 600 | 712 | 808 | 936 | 1032 | |
| 7 | 104 | 224 | 328 | 472 | 584 | 712 | 840 | 968 | 1096 | 1224 | |
| 8 | 120 | 256 | 392 | 536 | 680 | 808 | 968 | 1096 | 1256 | 1384 | |
| 9 | 136 | 296 | 456 | 616 | 776 | 936 | 1096 | 1256 | 1416 | 1544 | |
| 10 | 144 | 328 | 504 | 680 | 872 | 1032 | 1224 | 1384 | 1544 | 1736 | |
| 11 | 176 | 376 | 584 | 776 | 1000 | 1192 | 1384 | 1608 | 1800 | 2024 | |
| 12 | 208 | 440 | 680 | 904 | 1128 | 1352 | 1608 | 1800 | 2024 | 2280 | |
| 13 | 224 | 488 | 744 | 1000 | 1256 | 1544 | 1800 | 2024 | 2280 | 2536 | |
| 14 | 256 | 552 | 840 | 1128 | 1416 | 1736 | 1992 | 2280 | 2600 | 2856 | |
| 15 | 280 | 600 | 904 | 1224 | 1544 | 1800 | 2152 | 2472 | 2728 | 3112 | |
| 16 | 328 | 632 | 968 | 1288 | 1608 | 1928 | 2280 | 2600 | 2984 | 3240 | |
| 17 | 336 | 696 | 1064 | 1416 | 1800 | 2152 | 2536 | 2856 | 3240 | 3624 | |
| 18 | 376 | 776 | 1160 | 1544 | 1992 | 2344 | 2792 | 3112 | 3624 | 4008 | |
| 19 | 408 | 840 | 1288 | 1736 | 2152 | 2600 | 2984 | 3496 | 3880 | 4264 | |
| 20 | 440 | 904 | 1384 | 1864 | 2344 | 2792 | 3240 | 3752 | 4136 | 4584 | |
| 21 | 488 | 1000 | 1480 | 1992 | 2472 | 2984 | 3496 | 4008 | 4584 | 4968 | |
| 22 | 520 | 1064 | 1608 | 2152 | 2664 | 3240 | 3752 | 4264 | 4776 | 5352 | |
| 23 | 552 | 1128 | 1736 | 2280 | 2856 | 3496 | 4008 | 4584 | 5160 | 5736 | |
| 24 | 584 | 1192 | 1800 | 2408 | 2984 | 3624 | 4264 | 4968 | 5544 | 5992 | |
| 25 | 616 | 1256 | 1864 | 2536 | 3112 | 3752 | 4392 | 5160 | 5736 | 6200 | |
| 26 | 712 | 1480 | 2216 | 2984 | 3752 | 4392 | 5160 | 5992 | 6712 | 7480 | |

A description is given of the TBS determination scheme in the LTE or LTE-A system with reference to Table 2. For example, it is assumed that the UE is aware that PUSCH is modulated with QPSK, $I_{TBS}$=9, and $N_{PRB}$=9 based on uplink scheduling information received from the ENB. Referring to Table 2, TBS is 1416 bits. As 12 SC-FDMA symbols of one subframe excluding two SC-FDMA symbols for RS transmission are available for PUSCH transmission, the number of REs assigned to PUSCH transmission during the 9 scheduled RBs is 1298 (=12 SC-FDMA symbols×9 RBs×12 REs). As QPSK modulation is scheduled, total 2596 bits (=1298 REs×2 (QPSK)) are available for PUSCH transmission. In addition, the effective channel coding rate is defined by Equation 3.

Effective channel coding rate=the number of bits of data to be transmitted (cyclic redundancy check (CRC) included)/the number of channel bits    Equation 3

In the above example, assuming 24-bit cyclic redundancy check (CRC) for error detection, the effective channel coding rate for PUSCH transmission is 0.555(=(1298+24)/2596).

In Embodiment I-2, the TBS determination scheme of the UE is adjusted as follows so as to lower the effective channel coding rate, resulting in higher error correction performance. To determine TBS with reference to the TBS table, the UE replaces $N_{PRB}$ with $N'_{PRB}$ computed using Equation 4.

$$N'_{PRB}=\max(\lfloor N_{PRB} \times k \rfloor, 1)$$    Equation 4

In Equation 4, 0<k≤1. When k<1, the UE uses a value less than $N_{PRB}$ notified by the ENB, resulting in lowering the value of TBS. The value of k may be notified by the ENB to the UE via signaling or may be set to a fixed value. Here, k may be set for aggregated cells. For the above example, assuming k=0.8, $N'_{PRB}$=7 from Equation 4, TBS=1096 bits with reference to Table 2, and new TBS is less than old TBS (1416 bits) by 320 bits. The effective channel coding rate becomes 0.431 (=(1096+24)/2596). Hence, the new scheme achieves better error correction performance compared with the existing scheme. Multiplexing UCI having a relatively large number of bits with PUSCH may reduce performance degradation in comparison to the existing TBS determination scheme.

Embodiment I-3

In Embodiment I-3, in the case where the UE transmits the ENB UCI (including HARQ ACK/NACK information or RI information) in a multiplexed form with PUSCH, the ENB is directed to apply at least one of the following schemes in addition to the existing PUSCH scheduling operation.

1) Scheme 1
The ENB may perform scheduling so that the PUSCH transmission bandwidth is greater than preset threshold Y.

2) Scheme 2
The ENB may perform scheduling so that the effective channel coding rate for PUSCH is less than preset threshold Z.

3) Scheme 3
The ENB may perform scheduling so that PUSCH TBS is relatively small.

4) Scheme 4
The ENB may perform scheduling so that PUSCH modulation is carried out using a relatively high-index modulation scheme.

5) Scheme 5
The ENB may additionally perform scheduling so that $\beta_{offset}^{HARQ\text{-}ACK}$ or $\beta_{offset}^{RI}$ has a relatively small value.

By use of the above schemes, it is possible for the UE to prevent UCI from occupying a too large proportion of scheduled PUSCH radio resources, minimizing reception performance degradation of UCI or data. Here, the thresholds Y and Z may be defined internally by the scheduler of the ENB or may be defined by the standard specification. The threshold Y may be represented in units of RBs or subcarriers.

Additionally, $\beta_{offset}^{HARQ\text{-}ACK}$, $\beta_{offset}^{RI}$ and the like may be determined based on information signaled by the ENB. The ENB may signal offset information (e.g., offset index) for $\beta_{offset}^{HARQ\text{-}ACK}$ or $\beta_{offset}^{RI}$. In the present embodiment of the present disclosure, the ENB may transmit the UE at least two pieces of offset information including offset information related to additional scheduling via signaling when the following conditions are satisfied. The UE may determine $\beta_{offset}^{HARQ\text{-}ACK}$ or $\beta_{offset}^{RI}$ by use of offset information related to additional scheduling among at least two pieces of offset information received from the ENB according to the satisfaction of the following conditions. The ENB may transmit such offset information to the UE via higher layer signaling or L1 signaling.

When at least one of the following conditions is satisfied, the ENB may perform scheduling by use of the above first to fifth schemes. The ENB may also perform PUSCH transmission according to additional scheduling operations of the ENB as described above when at least one of the following conditions is satisfied.

1) Condition 1
The number of aggregatable cells in the UE for CA is greater than threshold A. For example, A may be set to 5.

2) Condition 2
The number of activated cells among the aggregatable cells in the UE for CA is greater than threshold B. For example, B may be set to 5.

3) Condition 3
The UE transmits UCI (HARQ ACK/NACK or RI information) with a size greater than threshold C at the time of PUSCH transmission scheduled by the ENB (e.g., the number of bits of HARQ ACK/NACK is greater than threshold C).

When more than one of the first to three conditions is satisfied, at least one of the above first to fifth schemes may be applied. For example, the first and third conditions are satisfied, at least one of the above first to fifth schemes may be applied. One or more of the above first to fifth schemes may be applied according to various other combinations.

Here, the thresholds A and B may be defined internally by the scheduler of the ENB. The above conditions may also be applied to the Embodiment I-1 and Embodiment I-2. For example, when at least one of the conditions is satisfied, the ENB and UE may perform operations according to at least one of Embodiment I-1 and Embodiment I-2.

Figure 6:
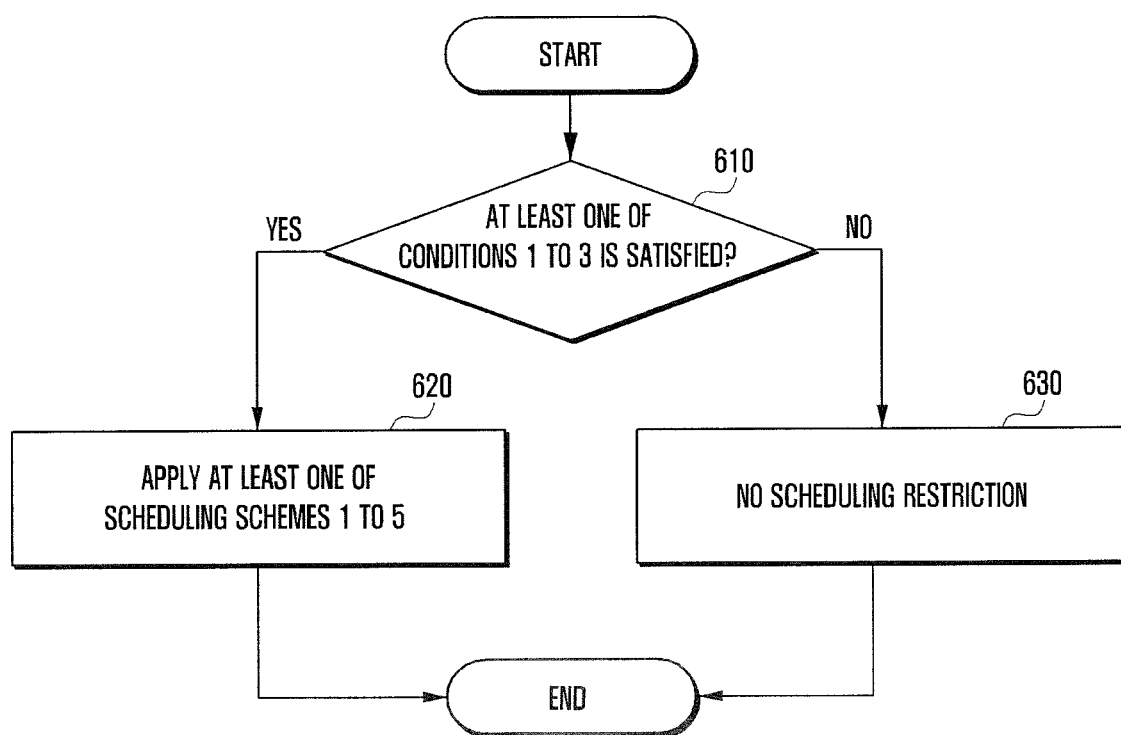
FIG. 6 illustrates a procedure of adjusting PUSCH scheduling of an ENB according to an Embodiment I-3 of the present disclosure.

FIG. 6 illustrates a general procedure of adjusting PUSCH scheduling of an ENB according to an Embodiment I-3 according to an embodiment of the present disclosure.

Referring to FIG. 6, at operation 610, the ENB determines whether at least one of conditions 1 to 3 is satisfied. If at least one of conditions 1 to 3 is satisfied, at operation 620, the ENB performs scheduling by use of at least one of schemes 1 to 5. If no condition is satisfied, at operation 630, the ENB may perform regular scheduling according to the existing scheme (i.e., without application of schemes 1 to 5).

Although not shown, the UE may also determines whether at least one of conditions 1 to 3 is satisfied. If at least one of conditions 1 to 3 is satisfied, the UE may perform PUSCH transmission based on the additional scheduling operations of the ENB related to schemes 1 to 5.

Figure 7:
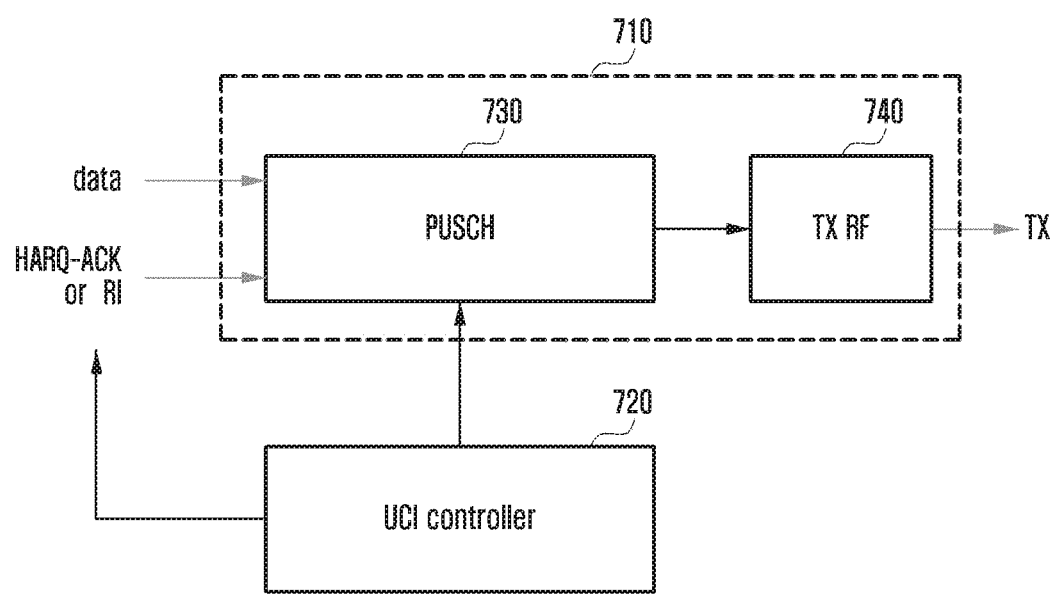
FIG. 7 is a block diagram of a UE according to an Embodiment I of the present disclosure.

FIG. 7 is a block diagram of a UE according to an Embodiment I of the present disclosure.

Referring to FIG. 7, the UE may include a communication unit 710 composed of a PUSCH block 730, transmit RF block 740 and receive RF block (not shown), and a control unit including a UCI controller 720. The UCI controller 720 controls a process of generating HARQ ACK/NACK information according to error occurrences in PDSCH reception from the ENB, and generating CSI information according to downlink channel measurements.

The UCI controller 720 controls multiplexing UCI with PUSCH according to various embodiments of the present disclosure. The PUSCH block 730 applies channel coding and modulation to uplink data and UCI to generate PUSCH. In the UE, the transmit RF block 740 applies RF signal processing to generated PUSCH and transmits PUSCH to the ENB.

In an embodiment of the present disclosure, the control unit may control the communication unit 710 to receive at least two different pieces of offset information. The control unit may determine the offset for PUSCH transmission according to, for example, the number of bits of HARQ ACK/NACK information based on at least one of the least two pieces of offset information. The control unit may determine the number of modulation symbols for UCI to be transmitted via PUSCH based on the PUSCH transmission offset.

In addition, the control unit may set PUSCH transmission offsets for a first case where the number of bits of HARQ ACK/NACK information is greater than a preset threshold and a second case where the number of bits of HARQ ACK/NACK information is not greater than the preset threshold, respectively, according to the two different pieces of offset information. When the number of cells configured in the UE is greater than a preset threshold, the control unit may determine an offset for PUSCH transmission based on the number of bits of HARQ ACK/NACK information.

Figure 8:
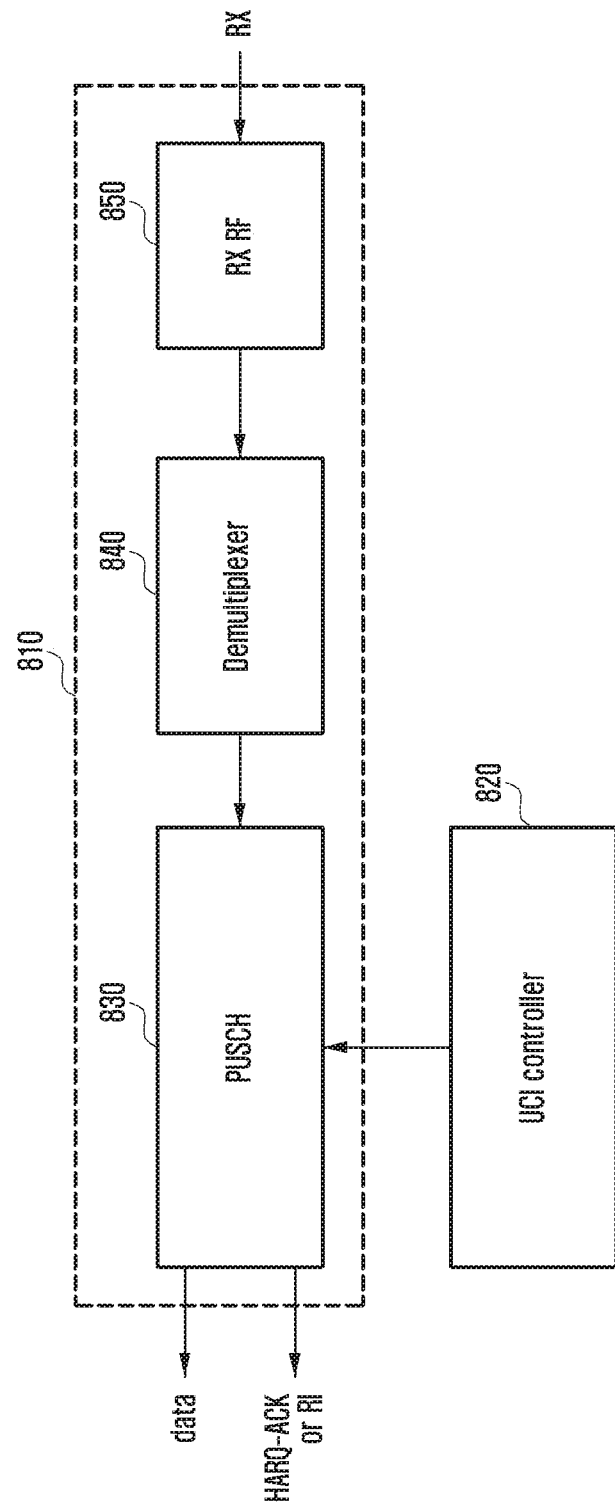
FIG. 8 is a block diagram of an ENB according to the Embodiment I of the present disclosure.

FIG. 8 is a block diagram of an ENB according to the Embodiment I of the present disclosure.

Referring to FIG. 8, for ease of description, components or units not directly related to the present disclosure are not shown or described. The ENB may include a communication unit 810 composed of a PUSCH block 830, demultiplexer 840, receive RF block 850 and transmit RF block (not shown), and a control unit including a UCI controller 820. The UCI controller 810 may control individual blocks of the communication unit 810 according to one of the above embodiments so that the ENB may receive UCI from the UE. In the communication unit 810, a received signal is signal-processed through the receive RF block 850, a PUSCH signal is separated from the processed signal through the demultiplexer 840, and UCI and data are obtained from the PUSCH signal through the PUSCH block 830.

In an embodiment of the present disclosure, the control unit of the ENB may control the communication unit 810 to transmit at least two different pieces of offset information to a UE. Here, the at least two pieces of offset information may be transmitted to the UE via higher layer signaling or L1 signaling. The control unit may control the communication unit 810 to receive UCI on PUSCH from the UE based on the number of modulation symbols determined by the UE according to the PUSCH transmission offset.

Embodiment II

Typical mobile communication systems have been developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The 3rd generation partnership project (3GPP) LTE-A system aims to realize high-speed packet based communication supporting a data rate of about 1 Gbps. In LTE-A, while the number of cells accessed by a UE is increased, feedback of each cell is transmitted only through the Pcell. In LTE-A, all cells accessed by a UE have the same duplex structure. As such, the cells may have a FDD structure or a TDD structure. Here, the TDD structure may have a static configuration whose UL-DL settings are fixed, or a dynamic configuration whose UL-DL settings are changed according to system information, higher layer signaling or downlink common control channels.

When the amount of downlink data traffic is greater than the amount of uplink data traffic in an environment where uplink and downlink data traffic is dynamically changing at specific times or places, flexible usage of uplink and downlink resources is more difficult in an FDD cell in comparison to a TDD cell. This is because two different frequencies are needed respectively for the uplink and the downlink in an FDD cell. For example, two different frequencies are reserved for downlink data transmission and uplink data transmission, respectively.

Accordingly, it is necessary to develop a scheme that enables FDD uplink frequency resources to be used for downlink data transmission when the amount of downlink data traffic is greater than the amount of uplink data traffic in an environment where uplink and downlink data traffic is dynamically changing.

The following description on embodiments is focused on LTE and LTE-A systems. However, it should be understood that the description is applicable to other communication systems involved with ENB scheduling without significant modifications.

Orthogonal frequency division multiplexing (OFDM) is a data transmission technique using multiple carriers. OFDM is a multi-carrier modulation scheme that parallelizes a serial input stream into parallel data streams and modulates the data streams onto orthogonal multiple carriers (i.e., subcarrier channels) for transmission.

In OFDM, modulation signals are located in two-dimensional time-frequency resources. In the time domain, resources are divided into different OFDM symbols that are orthogonal with each other. In the frequency domain, resources are divided into different subcarriers that are also orthogonal with each other. For example, the OFDM scheme may define a minimum unit resource by designating a particular OFDM symbol in the time domain and a particular subcarrier in the frequency domain. Such a minimum unit resource is referred to as a RE. Since different REs are orthogonal with each other after passing a frequency selective channel, signals transmitted via different REs can be received by a receiver side without causing interference to each other.

A physical channel is a physical layer channel for transmitting modulation symbols obtained by modulating one or more coded bit sequences. In an orthogonal frequency division multiple access (OFDMA) system, a plurality of physical channels can be configured for transmission depending on the usage of the information sequence or the receiver. The transmitter and the receiver have to determine REs on which a physical channel is arranged for transmission in advance, and this process is referred to as mapping.

In an OFDM system, the downlink bandwidth includes a plurality of RBs, and each PRB may be composed of 12 subcarriers arranged along the frequency axis and 14 or 12 OFDM symbols arranged along the time axis. Here, the PRB serves as a basic unit for resource allocation.

A RS is a signal that is transmitted by an ENB to enable a UE to perform channel estimation. In the LTE system, RSs include a common RS (CRS) and a demodulation RS (DMRS) serving as a UE-specific RS.

The CRS is a RS that is transmitted through the overall downlink bandwidth and can be received by all UEs, and may be used for channel estimation, feedback information generation for a UE, and demodulation of control and data channels. The DMRS is a RS that is transmitted through the overall downlink bandwidth, and may be used by a specific UE for data channel demodulation and channel estimation. Unlike the CRS, the DMRS is not used for feedback information generation of a UE. Therefore, the DMRS is transmitted via a PRB resource to be scheduled by the UE.

In the time domain, one subframe is composed of two slots having a length of 0.5 msec (i.e., a first slot and a second slot). The physical dedicated control channel (PDCCH) region (serving as a control channel area) and the EPDCCH region (serving is a data channel area) are separately transmitted in the time domain. This is to rapidly receive and demodulate the control channel signal. In addition, the PDCCH region is located across the overall downlink bandwidth, and one control channel is divided into smaller control channels, which are dispersed over the overall downlink bandwidth.

The uplink bandwidth is generally divided into a control channel (PUCCH) and a data channel (PUSCH). A response for downlink data and other feedback information are transmitted through the control channel if the data channel is not present, and transmitted through the data channel if the data channel is present.

Figure 9:
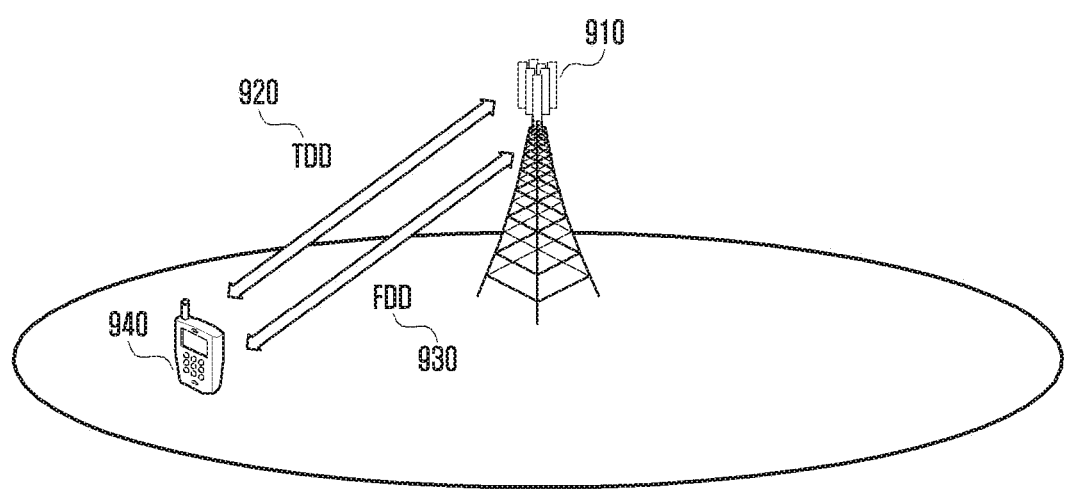
FIGS. 9 and 10 illustrate a communication system according to various embodiments of the present disclosure.
Figure 10:
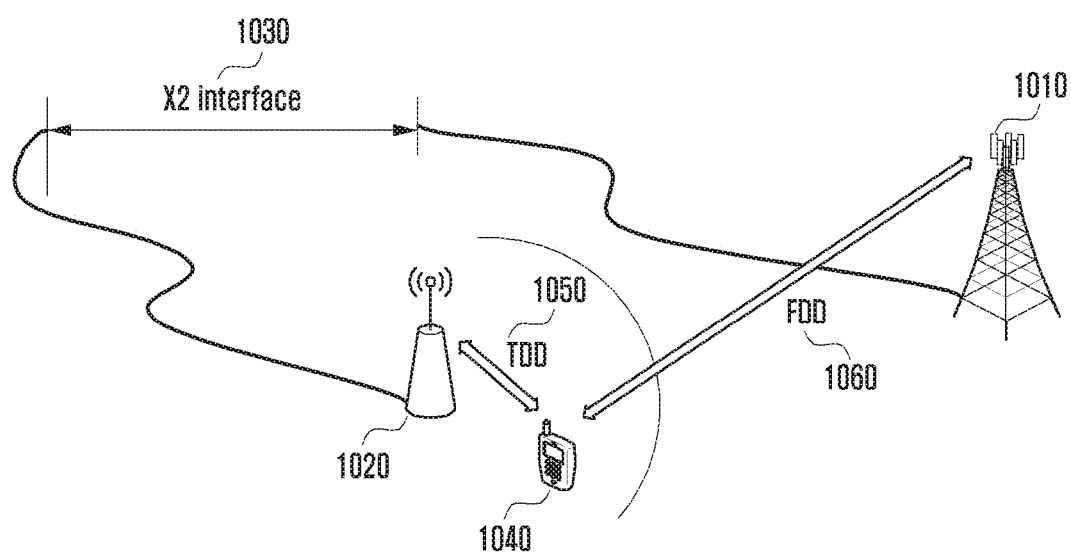

FIGS. 9 and 10 illustrate a communication system according to various embodiments of the present disclosure.

Referring to FIG. 9, a TDD cell 920 and an FDD cell 930 coexist under an ENB 910, and a UE 940 transmits and receives data to and from the ENB 910 via the TDD cell 920 and the FDD cell 930. When the FDD cell 930 is the Pcell, the UE 940 performs uplink transmission only via the FDD cell 930. This also applies when the cell 920 is an FDD cell.

Referring to FIG. 10, a macro ENB 1010 supporting a large coverage area and a pico ENB 1020 for an increased data rate are deployed. Here, to transmit and receive data to and from a UE 1040, a macro ENB 1010 supports an FDD cell 1060 and the pico ENB 1020 supports a TDD cell 1050. When the macro ENB 1010 is the Pcell, the UE 1040 may perform uplink transmission through the macro ENB 1010 only. In this case, an ideal backhaul network is assumed between the macro ENB 1010 and the pico ENB 1020. Thanks to a high-speed ENB-ENB X2 communication 1030, although uplink transmission is transmitted only to the macro ENB 1010, the pico ENB 1020 may obtain necessary control information from the macro ENB 1010 in real time through the X2 communication 1030. This also applies when the cell 1050 is an FDD cell.

The scheme of an embodiment of the present disclosure can be applied to both the network configuration of FIG. 9 and the network configuration of FIG. 10. For ease of description, the following description is mainly focused on the network configuration of FIG. 9.

Embodiment II-1

Figure 11:
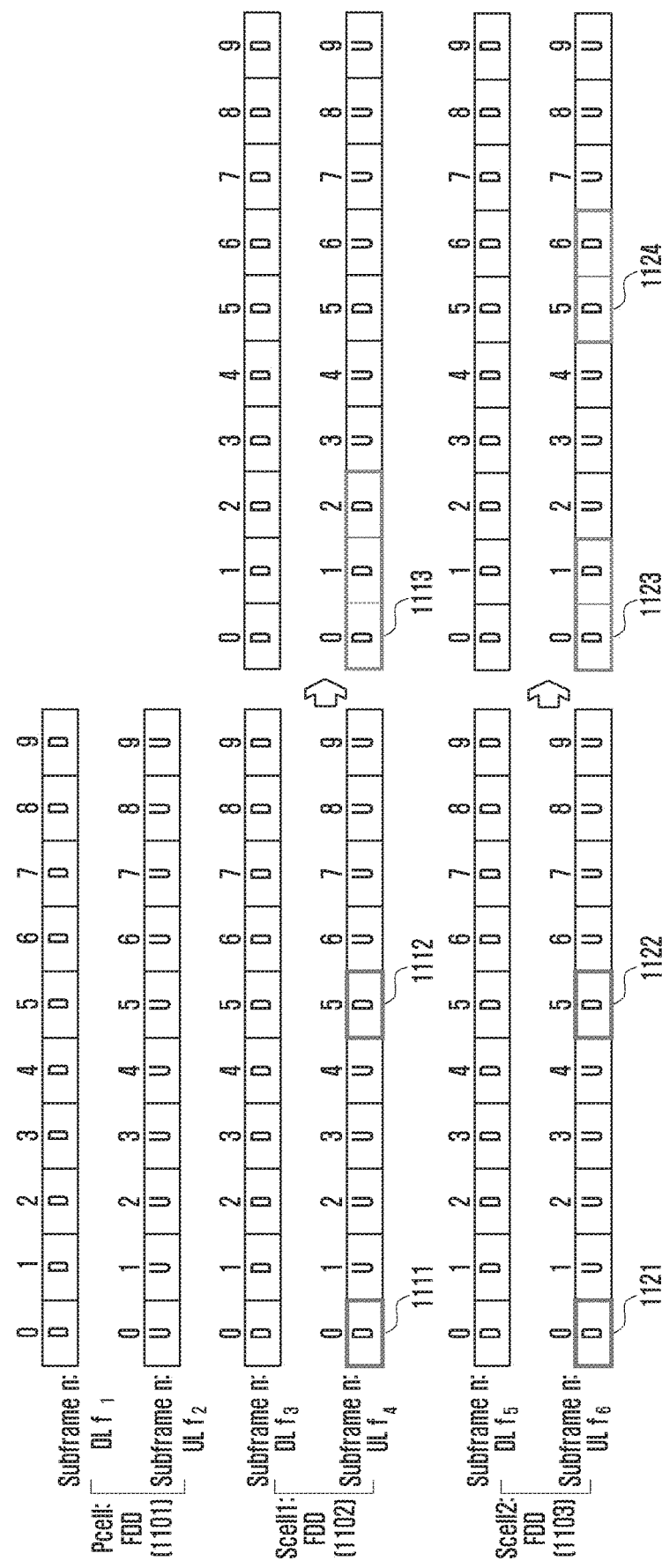
FIG. 11 illustrates a scheme for utilizing uplink frequency resources to transmit downlink data according to an Embodiment II-1 of the present disclosure.

FIG. 11 illustrates a scheme for utilizing uplink frequency resources to transmit downlink data according to the Embodiment II-1 of the present disclosure.

Referring to FIG. 11, at least one subframe at the uplink frequency of an FDD cell is configured as a pilot subframe, and channel measurement information obtained at the pilot subframe is applied to utilize uplink frequency resources for downlink data transmission.

FIG. 11 depicts a situation where FDD cells coexist with each other.

Referring to FIG. 11, a Pcell 1101 is an FDD cell with the downlink transmission frequency f1 and the uplink transmission frequency f2. An S cell 1 1102 is an FDD cell with the downlink transmission frequency f3 and the uplink transmission frequency f4. An Scell 2 1103 is an FDD cell with the downlink transmission frequency f5 and the uplink transmission frequency f6.

The UE may identify the downlink frequency f1 of the Pcell 1101 during cell search and identify the uplink frequency f2 of Pcell through system information received from the ENB. The UE may identify the downlink frequencies and uplink frequencies of the Scell 1 1102 and the Scell 2 1103 through higher layer information.

To utilize uplink frequency resources of the FDD Scell 1 1102 and the FDD Scell 2 1103 for downlink data transmission, the ENB has to determine the FDD cell whose uplink frequency resources are suitable for downlink data transmission. For a UE, the ENB may estimate channel information for downlink data transmission using an uplink frequency by use of information regarding SRS transmission or uplink transmission from the UE. However, the ENB has no data for examining interference effects of the UE when downlink data transmission is performed at an uplink frequency. This is because interference sources are the same for the ENB and the UE but their magnitudes are different. On the other hand, the UE may identify interference effects thereon at an uplink frequency through energy detection at the uplink frequency but has no data for examining the channel state when downlink data is received at the uplink frequency.

Hence, in Embodiment II-1, at least one subframe at the uplink frequency of an FDD cell is configured as a pilot subframe, and the UE uses a RS transmitted at the pilot subframe to measure CSI information (channel information or interference information, or a combination thereof) and reports the measured CSI information to the ENB. Thereby, the ENB may identify the level of appropriateness of performing downlink data transmission at an uplink frequency and determine the uplink frequency to be used for downlink data transmission.

In the embodiment of the present disclosure, when the amount of downlink data traffic is greater than the amount of uplink data traffic, to utilize uplink frequency resources, referring to FIG. 11, the ENB transmits the UE configuration information indicating that a subframe #0 1111 and a subframe #1 1112 of the uplink frequency f4 of an Scell 1 1102 are configured as a pilot subframe and a subframe #0 1121 and a subframe #1 1122 of the uplink frequency f6 of an Scell 2 1103 are configured as a pilot subframe. Such configuration information may be transmitted to a UE through a higher layer signal, system information, or an L1 signal. Here, the L1 signal is a physical layer signal and may be, for example, physical downlink control channel (PDCCH).

The ENB transmits an RS at the pilot subframes, so that the UE may perform channel measurement at the pilot subframes. The RS may be a signal, such as CRS or CSI-, or a synchronization signal, such as primary synchronization signal (PSS) or secondary synchronization signal (SSS), or a combination thereof.

The UE may perform CSI measurement using the RS and transmit measured CSI information to the ENB. Here, the CSI information may be channel information related with the uplink frequencies or interference information related with the uplink frequencies, or a combination thereof. The uplink resource for reporting CSI information may be pre-configured or may be requested by the UE through SR (Scheduling Request) transmission.

The ENB may receive CSI information for uplink frequencies from multiple UEs, piece together the received CSI information, determine the uplink frequency to be used for downlink transmission and the number of subframes to be used as a downlink subframe at the uplink frequency, and transmit corresponding configuration information to the UE. The configuration information may be transmitted to a UE through a higher layer signal, system information, or an L1 signal. In FIG. 11, the subframe indicated by indicia 1113 is configured as a downlink subframe for the uplink frequency f4, and the subframe indicated by indicia 1123 or 1124 is configured as a downlink subframe for the uplink frequency f6.

Figure 12A:
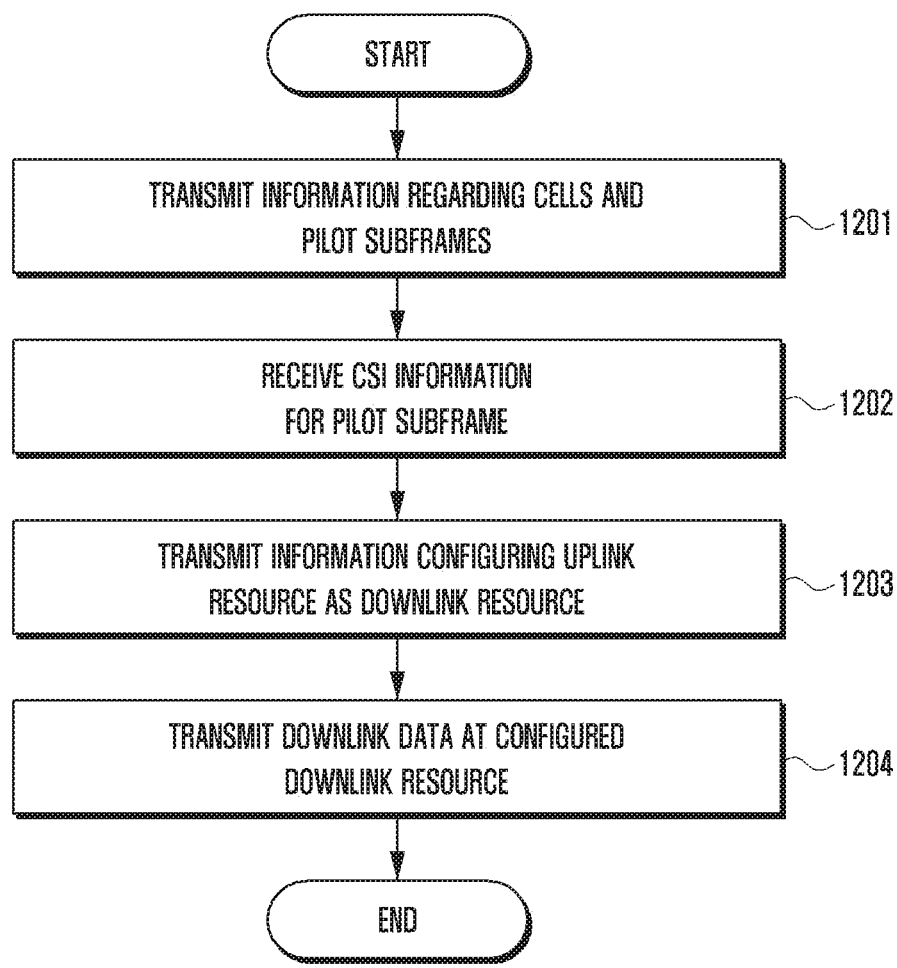
FIGS. 12A and 12B are flowcharts for ENB operations and UE operations according to the Embodiment II-1 of the present disclosure.
Figure 12B:
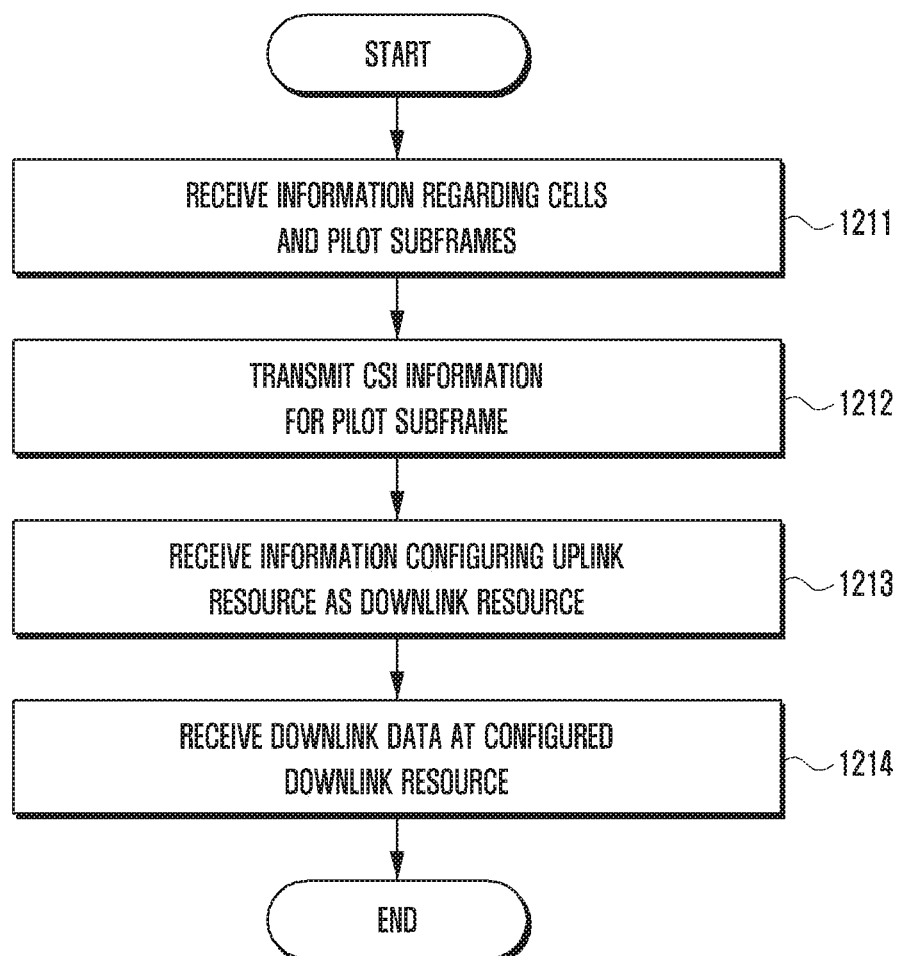

FIGS. 12A and 12B are flowcharts for ENB operations and UE operations according to the Embodiment II-1 of the present disclosure. ENB operations are described first with reference to FIG. 12A.

Referring to FIG. 12A, at operation 1201, the ENB transmits configuration information regarding cells and pilot subframes to the UE. Cell information may be at least one of information on the uplink frequency and downlink frequency of an FDD cell, and information on UL-DL configurations and special subframes of a TDD cell. Information on FDD and TDD cells may be transmitted to a UE via system information or higher layer information. Configuration information for pilot subframes may include at least one of information indicating the position of at least one pilot subframe of an uplink frequency, information on the transmit power at the pilot subframe, and information indicating the RS transmitted at the pilot subframe. Configuration information for pilot subframes may be transmitted to a UE via system information, a higher layer signal, or an L1 signal.

At operation 1202, the ENB transmits a RS at a pilot subframe of each uplink frequency and receives CSI information at the pilot subframe from the UE. To enable the UE to transmit CSI information, the ENB may pre-allocate an uplink data resource to the UE through higher layer signaling or may schedule an uplink data resource according to SR reception from the UE.

At operation 1203, the ENB configures some subframes of an uplink frequency as a downlink subframe based on the CSI information and transmits corresponding configuration information to the UE. Such configuration information may be transmitted to the UE via higher layer signaling or L1 signaling.

At operation 1204, the ENB transmits the UE downlink data at the configured downlink subframe of the uplink frequency.

A description is given of UE operations with reference to FIG. 12B.

Referring to FIG. 12B, at operation 1211, the UE receives configuration information regarding cells and pilot subframes from the ENB. Cell information may be at least one of information on the uplink frequency and downlink frequency of an FDD cell, and information on UL-DL configurations and special subframes of a TDD cell. Information on FDD and TDD cells may be received from the ENB via system information or higher layer information. Configuration information for pilot subframes may include at least one of information indicating the position of at least one pilot subframe of an uplink frequency, information on the transmit power at the pilot subframe, and information indicating the RS transmitted at the pilot subframe. Configuration information for pilot subframes may be received from the ENB via system information, higher layer signaling, or L1 signaling.

At operation 1212, the UE measures CSI information using a RS at a pilot subframe of each uplink frequency and transmits CSI information measured at the pilot subframe to the ENB. The uplink resource for CSI reporting may be pre-configured by the ENB via higher layer signaling or may be requested by the UE through SR transmission.

At operation 1213, the UE receives configuration information designating a subframe of an uplink frequency as a downlink subframe from the ENB. The UE may receive such configuration information from the ENB via higher layer signaling or L1 signaling.

At operation 1214, the UE receives downlink data from the ENB at the configured downlink subframe of the uplink frequency.

Embodiment II-2

A description is given of a scheme to utilize uplink frequency resources for downlink data transmission according to Embodiment II-2 of the present disclosure. In embodiment II-2, to utilize uplink frequency resources of an FDD cell for downlink data transmission, the ENB requests the UE to transmit CSI information for each uplink frequency, determines whether to use an uplink frequency for downlink data transmission based on the CSI information, and utilizes an uplink frequency to transmit downlink data if appropriate.

To utilize uplink frequency resources of FDD Scell 1 (1102 in FIG. 11) and FDD Scell 2 (1103) for downlink data transmission, the ENB has to determine the FDD cell whose uplink frequency resources are suitable for downlink data transmission. For a UE, the ENB may estimate channel information for downlink data transmission using an uplink frequency by use of information regarding SRS transmission or uplink transmission from the UE. However, the ENB has no data for examining interference effects of the UE when downlink data transmission is performed at an uplink frequency. This is because interference sources are the same for the ENB and the UE but their magnitudes are different. On the other hand, the UE may identify interference effects thereon at an uplink frequency through energy detection at the uplink frequency but has no data for examining the channel state when downlink data is received at the uplink frequency.

Hence, in Embodiment II-2, the UE may trigger energy detection, such as received signal strength indicator (RSSI) at an uplink frequency, and report measured energy information (containing information on the level of interference) to the ENB. Thereby, the ENB may identify the level of appropriateness of performing downlink data transmission at an uplink frequency, and determine the uplink frequency to be used for downlink data transmission accordingly.

When the amount of downlink data traffic is greater than the amount of uplink data traffic, to utilize uplink frequency resources for transmitting downlink data traffic, the ENB may direct the UE to trigger energy detection like RSSI and report the result. For triggering, the ENB may instruct the UE to report energy states at a given uplink frequency via L1 signaling using multiple bits or via higher layer signaling.

Through such triggering, the UE performs energy measurement for interference at a given uplink frequency and transmits measured energy information to the ENB. The uplink resource for energy information reporting may be pre-configured, may be notified via L1 signaling, or may be requested by the UE through SR transmission.

The ENB may receive interference information for uplink frequencies from multiple UEs, piece together the received interference information, determine the uplink frequency to be used for downlink transmission and the number of subframes to be used as a downlink subframe at the uplink frequency, and transmit corresponding configuration information to the UE. This configuration information may be transmitted to a UE through higher layer signaling, system information, or L1 signaling. For example, in FIG. 11, the subframe indicated by indicia 1113 is configured as a downlink subframe for the uplink frequency f4, and the subframe indicated by indicia 1123 or 1124 is configured as a downlink subframe for the uplink frequency f6. In Embodiment II-2, the ENB may prevent interference due to uplink transmission at a given uplink frequency through scheduling before triggering interference measurement for the uplink frequency. This is because utilizing specific subframes of an uplink frequency for downlink transmission means absence of uplink transmission during the subframes.

Unlike Embodiment II-1, there is no need to configure pilot subframes in Embodiment II-2. Hence, Embodiment II-2 may remedy a shortcoming of Embodiment II-1 that uplink data transmission is not possible during the time needed for such configuration.

Figure 13A:
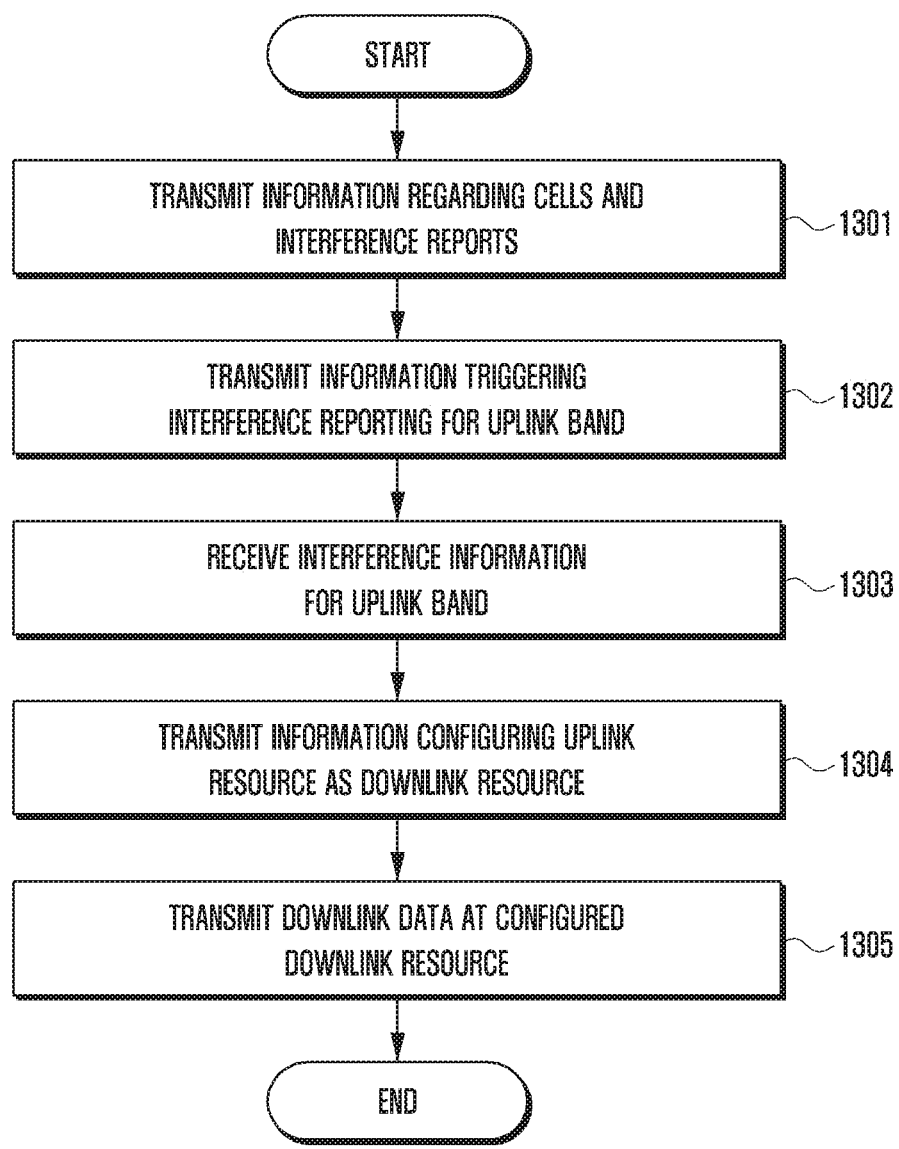
FIGS. 13A and 13B are flowcharts for ENB operations and UE operations in a case of utilizing uplink frequency resources to transmit downlink data according to an Embodiment II-2 of the present disclosure.
Figure 13B:
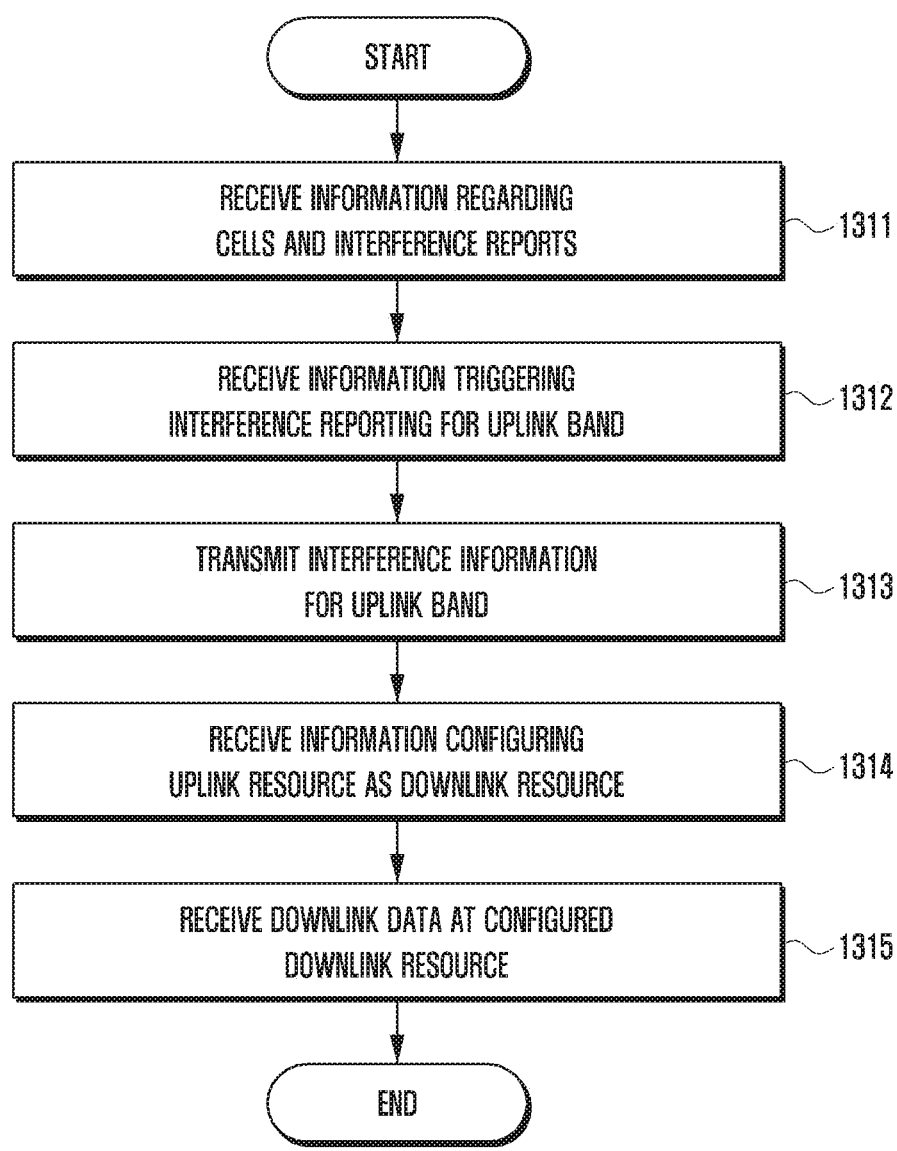

FIGS. 13A and 13B are flowcharts for ENB operations and UE operations in a case of utilizing uplink frequency resources to transmit downlink data according to the Embodiment II-2 of the present disclosure. ENB operations are described first with reference to FIG. 13A.

Referring to FIG. 13A, at operation 1301, the ENB transmits information regarding cells and interference reports to the UE. Cell information may be at least one of information on the uplink frequency and downlink frequency of an FDD cell, and information on UL-DL configurations and special subframes of a TDD cell. Information on FDD and TDD cells may be transmitted to a UE via system information or higher layer information. Interference report information may be at least one of information on mappings between L1 signal bits and uplink frequencies, and information on an uplink resource to be used to transmit an interference report. Such interference report information may be transmitted via system information or higher layer signaling.

At operation 1302, the ENB transmits information for triggering interference reporting for each uplink frequency. Interference report triggering information may be transmitted via higher layer signaling or L1 signaling.

At operation 1303, the ENB receives a report containing interference information for the uplink frequencies.

At operation 1304, the ENB configures a subframe of an uplink frequency as a downlink subframe based on the interference information and channel information obtained by SRS or uplink transmission from the UE, and transmits corresponding configuration information to the UE. Such configuration information may be transmitted to the UE via higher layer signaling or L1 signaling.

At operation 1305, the ENB transmits the UE downlink data at the configured downlink subframe of the uplink frequency.

A description is given of UE operations with reference to FIG. 13B. Referring to FIG. 13B, at operation 1311, the UE receives information regarding cells and interference reports from the ENB. Cell information may be at least one of information on the uplink frequency and downlink frequency of an FDD cell, and information on UL-DL configurations and special subframes of a TDD cell. Information on FDD and TDD cells may be received from the ENB via system information or higher layer information. Interference report information may be at least one of information on mappings between L1 signal bits and uplink frequencies, and information on an uplink resource to be used to transmit an interference report. The interference report information may be received from the ENB via system information or higher layer signaling.

At operation 1312, the UE receives information for triggering interference reporting for each uplink frequency from the ENB. Interference report triggering information may be received via higher layer signaling or L1 signaling.

At operation 1313, the UE transmits the ENB a report containing interference information for the uplink frequencies. The uplink resource for interference reporting may be pre-configured, be notified via L1 signaling, or be requested by the UE through SR transmission.

At operation 1314, the UE receives configuration information designating a subframe of an uplink frequency as a downlink subframe from the ENB. The UE may receive such configuration information from the ENB via higher layer signaling or L1 signaling.

At operation 1315, the UE receives downlink data from the ENB at the configured downlink subframe of the uplink frequency.

Figure 14:
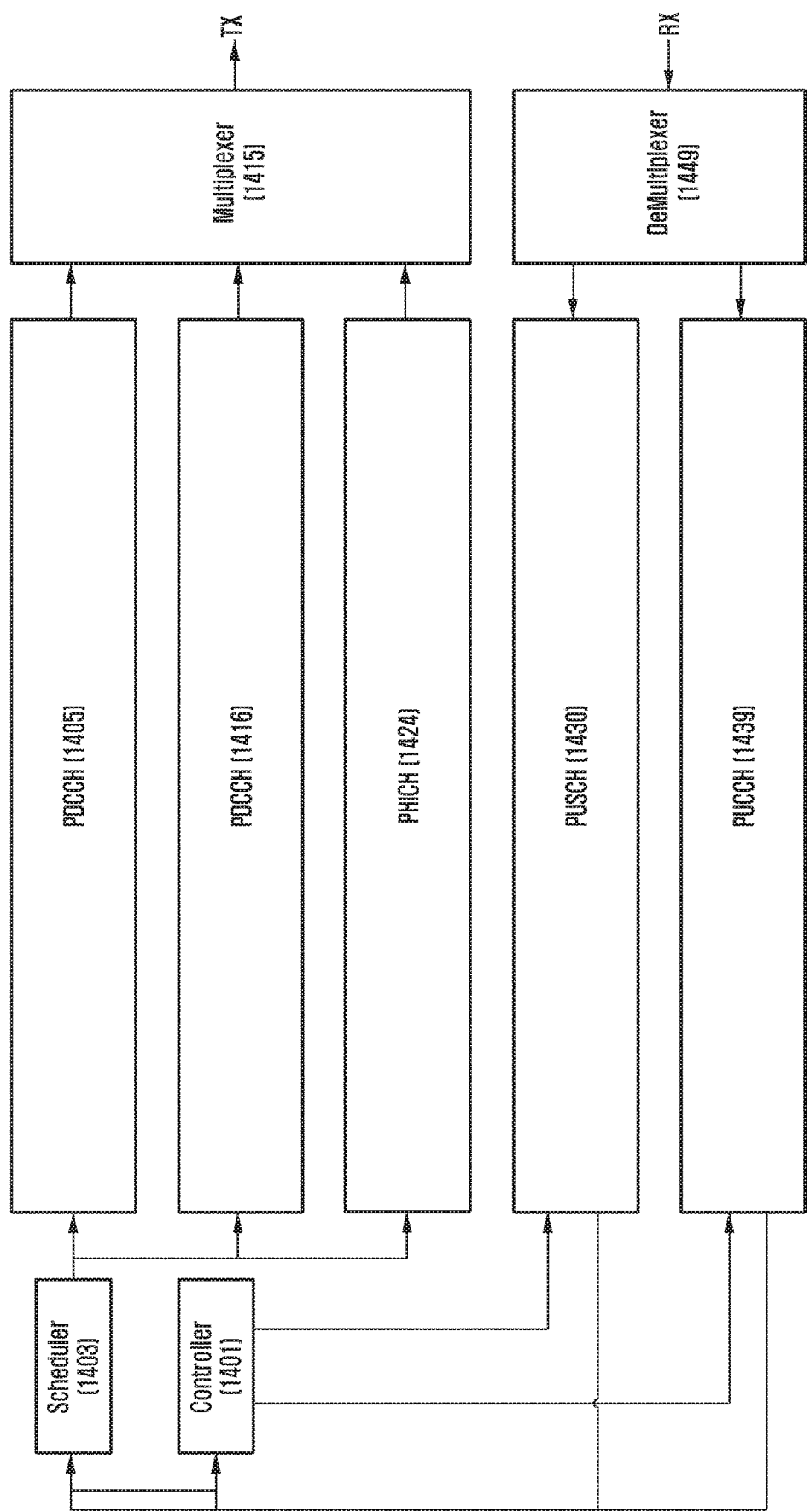
FIG. 14 is a block diagram of an ENB according to the Embodiment II of the present disclosure.

FIG. 14 is a block diagram of an ENB according to the Embodiment II of the present disclosure.

Referring to FIG. 14, the ENB may include a processor including a controller 1401 and a scheduler 1403, and a communication unit including a transmitter and a receiver.

The transmitter may include a PDCCH block 1405, a PDSCH block 1416, a physical hybrid-ARQ indicator channel (PHICH) block 1424, and a multiplexer 1415.

The receiver may include a PUSCH block 1430, a PUCCH block 1439 and a demultiplexer 1449.

The processor may control the ENB to realize operations according to Embodiment II of the present disclosure. For example, the processor may control ENB operations according to Embodiment II-1 by configuring a pilot subframe at a given uplink frequency and receiving UE channel information. The processor may also control ENB operations according to Embodiment II-2 by triggering interference measurement at a given uplink frequency, receiving interference information, configuring a specific subframe of an uplink frequency as a downlink subframe, and transmitting downlink data at the downlink subframe.

Multiple transmitters and receivers (except for the PUCCH block 1439) may be included for transmission and reception on multiple cells. For ease of description, it is assumed that the ENB includes one transmitter and one receiver.

For example, the controller 1401 may control a process of configuring a pilot subframe at a specific uplink frequency and receiving UE channel information. The controller 1401 may also control a process of triggering interference measurement at a given uplink frequency, receiving interference information, configuring a specific subframe of an uplink frequency as a downlink subframe, and transmitting downlink data at the downlink subframe. For a UE to be scheduled, the controller 1401 may adjust and determine timing relationships between physical channels based on the amount of data to be transmitted to the UE and available resources in the system, and notify the timing relationships to the scheduler 1403, the PDCCH block 1405, the PDSCH block 1416, the PHICH block 1424, the PUSCH block 1430 and the PUCCH block 1439. Specific control operations of the controller 1401 follow the above description of Embodiments II-1 and II-2 of the present disclosure.

At the transmitter, the PDCCH block 1405 generates control information under the control of the scheduler 1403, and the generated control information is multiplexed with other signals at the multiplexer 1415.

Under the control of the scheduler 1403, the PDSCH block 1416 generates data, which is then multiplexed with other signals at the multiplexer 1415.

Under the control of the scheduler 1403, the PHICH block 1424 generates HARQ ACK/NACK information corresponding to PUSCH transmission from the UE. The generated HARQ ACK/NACK information is multiplexed with other signals at the multiplexer 1415.

The multiplexed signals are converted into an OFDM signal, which is then transmitted to the UE.

At the receiver, the PUSCH block 1430 obtains PUSCH data from a signal received from the UE and notifies occurrence of a decoding error in the PUSCH data to the scheduler 1403 and the controller 1401. The scheduler 1403 adjusts generation of downlink HARQ ACK/NACK according to occurrences of decoding error, and the controller 1401 adjusts the timing of downlink HARQ ACK/NACK transmission according to occurrences of decoding error.

The PUCCH block 1439 obtains uplink ACK/NACK or CQI from a signal received from the UE and notifies the uplink ACK/NACK or CQI to the scheduler 1403, which then uses the same to determine whether to perform PDSCH retransmission and the MCS to use. The uplink ACK/NACK is notified to the controller 1401, which then uses the same to adjust the timing of PDSCH transmission.

Figure 15:
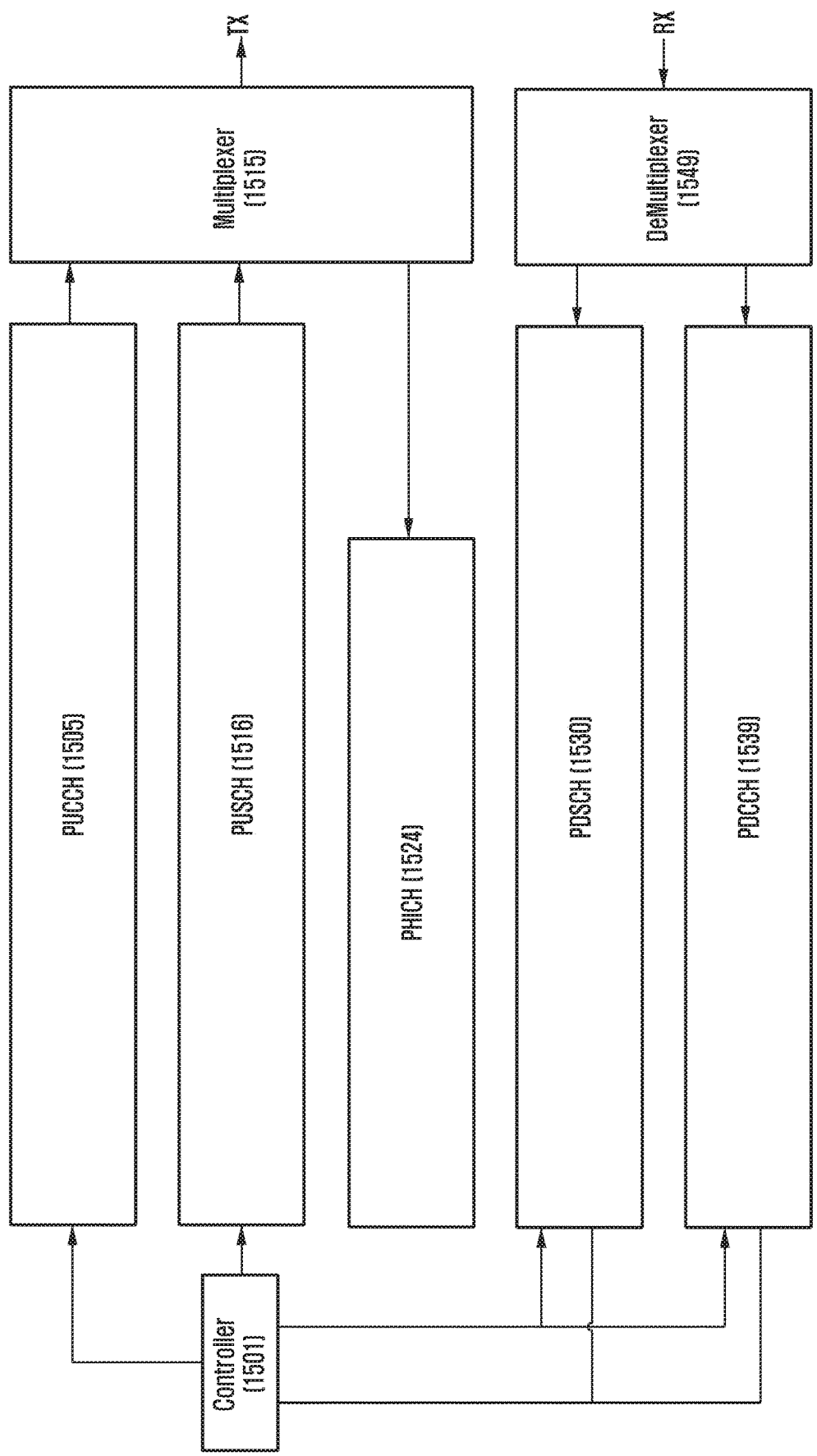
FIG. 15 is a block diagram of a UE according to the Embodiment II of the present disclosure.

FIG. 15 is a block diagram of a UE according to the Embodiment II of the present disclosure.

Referring to FIG. 15, the UE may include a processor including a controller 1501, and a communication unit including a transmitter and a receiver.

The transmitter may include a PUCCH block 1505, a PUSCH block 1516, and a multiplexer 1515.

The receiver may include a PHICH block 1524, a PDSCH block 1530, a PDCCH block 1539, and a demultiplexer 1549.

The processor may control the UE to realize operations according to Embodiment II of the present disclosure. The processor may control UE operations according to Embodiment II-1 by receiving configuration information designating a pilot subframe at a given uplink frequency and transmitting channel information. The processor may also control UE operations according to Embodiment II-2 by receiving information triggering interference measurement at a given uplink frequency, transmitting interference information, receiving information designating a specific subframe of an uplink frequency as a downlink subframe, and receiving downlink data at the downlink subframe.

Multiple transmitters and receivers may be included for transmission and reception on multiple cells. For ease of description, it is assumed that the UE includes one transmitter and one receiver.

For example, the controller 1501 may control a process of receiving configuration information designating a pilot subframe at a given uplink frequency and transmitting channel information, and control a process of receiving information triggering interference measurement at a given uplink frequency, transmitting interference information, receiving information designating a specific subframe of an uplink frequency as a downlink subframe, and receiving downlink data at the downlink subframe. The controller 1501 may notify corresponding configuration information to the PDCCH block 1539 and the PDSCH block 1530. Specific control operations of the controller 1501 follow the above description of Embodiments II-1 and II-2 of the present disclosure.

At the transmitter, the PUCCH block 1505 generates HARQ ACK/NACK or CQI as UCI under the control of the controller 1501 controlling storage of downlink data in a soft buffer. The generated HARQ ACK/NACK or CQI is multiplexed with other signals at the multiplexer 1515, and the multiplexed signals are transmitted to the ENB in a suitable PUCCH transport format.

The PUSCH block 1516 extracts data to be transmitted, and the extracted data is multiplexed with other signals at the multiplexer 1515.

The multiplexed signals are converted into an SC-FDMA signal, which is then transmitted to the ENB based on DL/UL HARQ-ACK timings.

At the receiver, the PHICH block 1524 separates a PHICH signal via the demultiplexer 1549 from a signal received from the ENB according to DL/UL HARQ-ACK timings and determines HARQ ACK/NACK for PUSCH.

The PDSCH block 1530 obtains PDSCH data by separating a PDSCH signal via the demultiplexer 1549 from a signal received from the ENB and notifies occurrence of a decoding error in the PDSCH data to the PUCCH block 1505 and the controller 1501. The PUCCH block 1505 adjusts generation of uplink HARQ ACK/NACK according to occurrences of decoding error, and the controller 1501 adjusts the timing of uplink HARQ ACK/NACK transmission according to occurrences of decoding error.

The PDCCH block 1539 separates a PDCCH signal via the demultiplexer 1549 from a signal received from the ENB, performs DCI format decoding, and obtains DCI from the decoded signal.

According to various embodiments of the present disclosure, for an FDD system operating in an environment where uplink and downlink data traffic is dynamically changing, when the amount of downlink data traffic is greater than the amount of uplink data traffic, it is possible to utilize uplink frequency resources of an FDD cell for downlink data transmission, increasing the data transfer rate of a UE.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method performed by a terminal in a wireless communication system, the method comprising:
   receiving a plurality of offset parameters from a base station;
   identifying an offset associated with a physical uplink shared channel (PUSCH) based on a number of bits of hybrid automatic repeat request (HARQ) acknowledgement (ACK) information, the offset corresponding to at least one of the plurality of the offset parameters;
   identifying a number of coded modulation symbols based on the identified the offset associated with the PUSCH; and
   transmitting, to the base station, uplink control information (UCI) on the PUSCH based on the identified number of the coded modulation symbols.

2. The method of claim 1,
   wherein the offset associated with the PUSCH includes a HARQ ACK offset, and
   wherein the UCI transmitted on the PUSCH includes the HARQ ACK information.

3. The method of claim 1,
   wherein the offset associated with the PUSCH includes a channel state information offset, and
   wherein the UCI transmitted on the PUSCH includes channel state information.

4. The method of claim 1, wherein the identifying the offset associated with the PUSCH comprises:
   in case that the number of bits of the HARQ ACK information is greater than a preset threshold, configuring the offset associated with the PUSCH to a first value according to one of the plurality of offset parameters; and
   in case that the number of bits of the HARQ ACK information is not greater than the preset threshold, configuring the offset associated with the PUSCH to a second value according to other one of the plurality of offset parameters.

5. A method performed by a base station in a wireless communication system, the method comprising:
   transmitting, to a terminal, a plurality of offset parameters; and
   receiving uplink control information (UCI) on a physical uplink shared channel (PUSCH) based on a number of coded modulation symbols from the terminal,
   wherein an offset associated with the PUSCH is identified based on a number of bits of hybrid automatic repeat request (HARQ) acknowledgement (ACK) information, the offset corresponds to at least one of the plurality of the offset parameters, and the number of the coded modulation symbols is identified based on the identified offset associated with the PUSCH.

6. The method of claim 5,
   wherein the offset associated with the PUSCH includes a HARQ ACK offset, and
   wherein the UCI transmitted on the PUSCH includes the HARQ ACK information.

7. The method of claim 5,
   wherein the offset associated with the PUSCH includes a channel state information offset, and
   wherein the UCI transmitted on the PUSCH includes channel state information.

8. The method of claim 5,
   wherein the offset associated with the PUSCH is configured to a first value according to one of the plurality of offset parameters in case that the number of bits of the HARQ ACK information is greater than a preset threshold, and
   wherein the offset associated with the PUSCH is configured to a second value according to other one of the plurality of offset parameters in case that the number of bits of the HARQ ACK information is not greater than the preset threshold.

9. A terminal in a wireless communication system, the terminal comprising:
   a transceiver; and
   a control unit configured to control to:
     receive a plurality of offset parameters from a base station via the transceiver,
     identify an offset associated with a physical uplink shared channel (PUSCH) based on a number of bits of hybrid automatic repeat request (HARQ) acknowledgement (ACK) information, the offset corresponding to at least one of the plurality of the offset parameters,
     identifying a number of coded modulation symbols based on the identified the offset associated with the PUSCH, and
     transmit, to the base station via the transceiver, uplink control information (UCI) on the PUSCH based on the identified number of the coded modulation symbols.

10. The terminal of claim 9,
    wherein the offset associated with the PUSCH includes a HARQ ACK offset, and
    wherein the UCI transmitted on the PUSCH includes the HARQ ACK information.

11. The terminal of claim 9,
    wherein the offset associated with the PUSCH includes a channel state information offset, and
    wherein the UCI transmitted on the PUSCH includes channel state information.

12. The terminal of claim 9, wherein the control unit is further configured to:
    in case that the number of bits of the HARQ ACK information is greater than a preset threshold, configure the offset associated with the PUSCH to a first value according to one of the plurality of offset parameters, and
    in case that the number of bits of the HARQ ACK information is not greater than the preset threshold, configure the offset associated with the PUSCH to a second value according to other one of the plurality of offset parameters.

13. A base station in a wireless communication system, the base station comprising:
    a transceiver; and
    a control unit configured to control to:
      transmit, to a terminal via the transceiver, a plurality of offset parameters, and
      receive uplink control information (UCI) on a physical uplink shared channel (PUSCH) based on a number of coded modulation symbols from the terminal via the transceiver,
    wherein an offset associated with the PUSCH is identified based on a number of bits of hybrid automatic repeat request (HARQ) acknowledgement (ACK) information, the offset corresponds to at least one of the plurality of the offset parameters, and the number of the coded modulation symbols is identified based on the identified offset associated with the PUSCH.

14. The base station of claim 13,
wherein the offset associated with the PUSCH includes a HARQ ACK offset, and
wherein the UCI transmitted on the PUSCH includes the HARQ ACK information.

15. The base station of claim 13,
wherein the offset associated with the PUSCH includes a channel state information offset, and
wherein the UCI transmitted on the PUSCH includes channel state information.

16. The base station of claim 13,
wherein the offset associated with the PUSCH is configured to a first value according to one of the plurality of offset parameters in case that the number of bits of the HARQ ACK information is greater than a preset threshold, and
wherein the offset associated with the PUSCH is configured to a second value according to other one of the plurality of offset parameters in case that the number of bits of the HARQ ACK information is not greater than the preset threshold.

* * * * *